United States Patent [19]

Hammer et al.

[11] 4,341,345

[45] Jul. 27, 1982

[54] METHOD AND APPARATUS FOR POWER LOAD SHEDDING

[75] Inventors: Jeffrey M. Hammer, New Brighton; David C. Ullestad, St. Louis Park; Stephen J. Wesoloski, Eagan, all of Minn.

[73] Assignee: Honeywell Inc., Minneapolis, Minn.

[21] Appl. No.: 122,787

[22] Filed: Feb. 19, 1980

[51] Int. Cl.³ .................... H02J 1/00; F25B 29/00
[52] U.S. Cl. .................... 236/46 R; 165/29; 307/39
[58] Field of Search .............. 236/47, 46 R, 51; 165/12, 29; 307/35, 39

[56] References Cited

U.S. PATENT DOCUMENTS

| | | | |
|---|---|---|---|
| 3,359,551 | 12/1967 | Dennison | 340/310 |
| 3,834,617 | 9/1974 | Dyntar | 236/46 R |
| 3,933,197 | 1/1976 | Zimmer | 236/46 R |
| 3,972,471 | 8/1976 | Ziegler | 236/51 X |
| 4,001,557 | 1/1977 | Stephenson | 236/46 R |
| 4,023,043 | 5/1977 | Stevenson | 307/38 |
| 4,125,782 | 11/1978 | Pollnow, Jr. | 307/38 X |
| 4,174,064 | 11/1979 | Pratt, Jr. | 236/51 X |
| 4,228,511 | 1/1980 | Simcoe et al. | 307/39 X |

Primary Examiner—William E. Wayner
Attorney, Agent, or Firm—Charles G. Mersereau

[57] ABSTRACT

A method and apparatus for the control of power consumption in individual space-conditioning loads fed by an electric power network utilizes a commandable, programmable temperature control device which gradually, substantially continually changes the control setpoint in response to an external signal to reduce power consumption such that temperature changes go relatively unnoticed by the occupants. A radio receiver or the like is utilized to receive a signal from the power utility company and, in response to the signal, the setpoint function of the thermostat associated with the load becomes an electronically simulated function in accordance with the invention and the user-control setpoint is removed from the control loop. The effective load shedding is also greatly enhanced by the provision of an integral reset function in addition to the conventional proportional control within the temperature control system. The use of a plurality of such systems enables the power utility to control electric power network peak load with a minimum impact on the comfort of individuals in the conditioned spaces.

20 Claims, 23 Drawing Figures

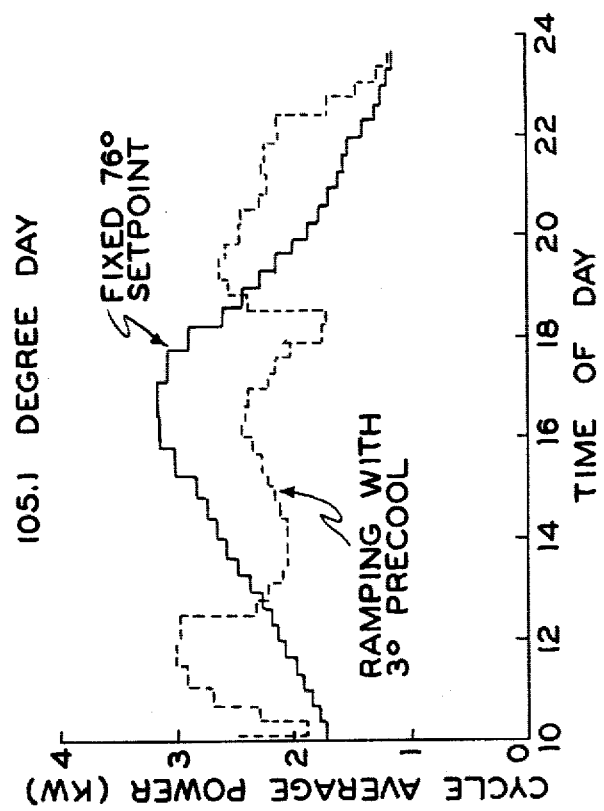
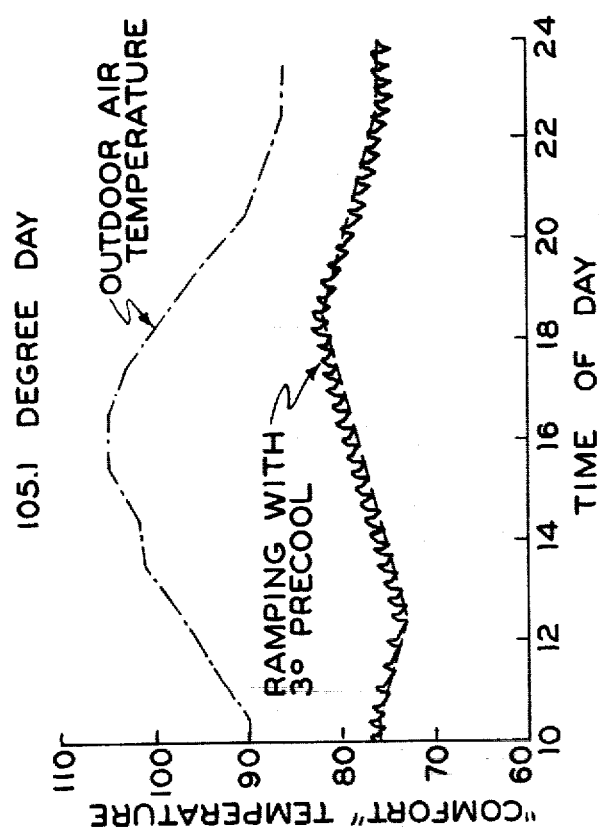

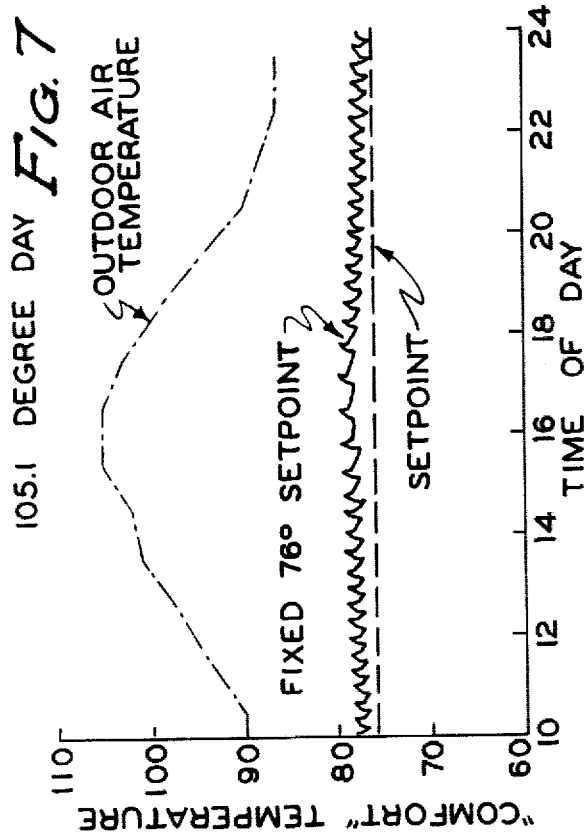

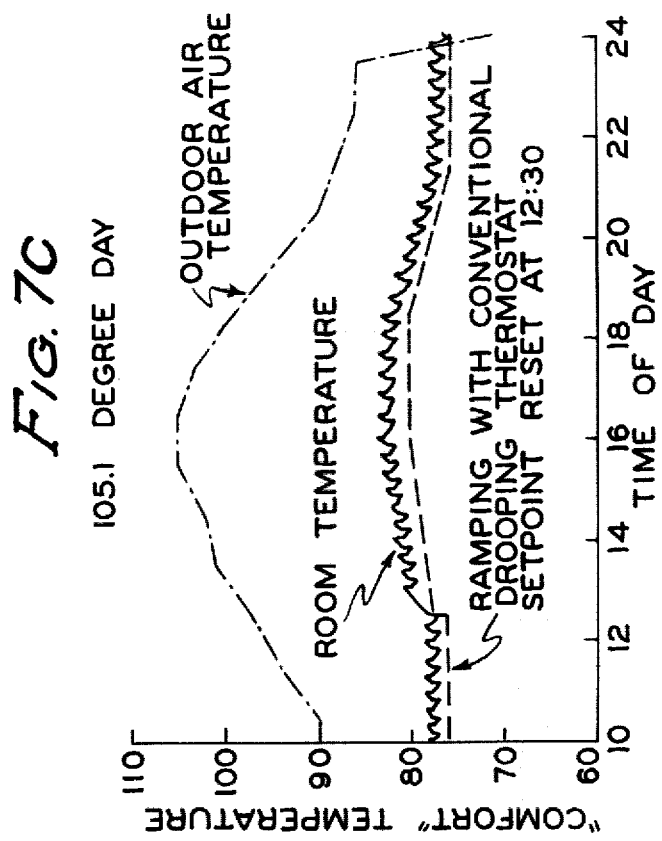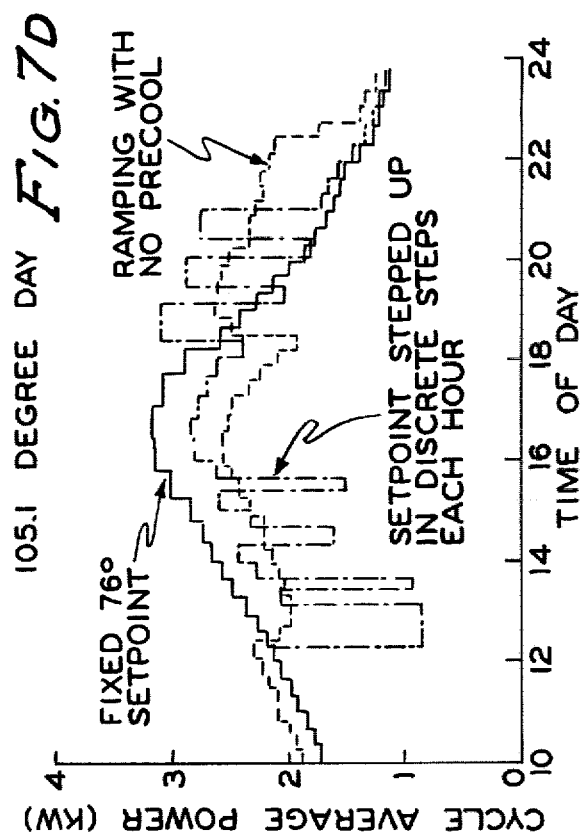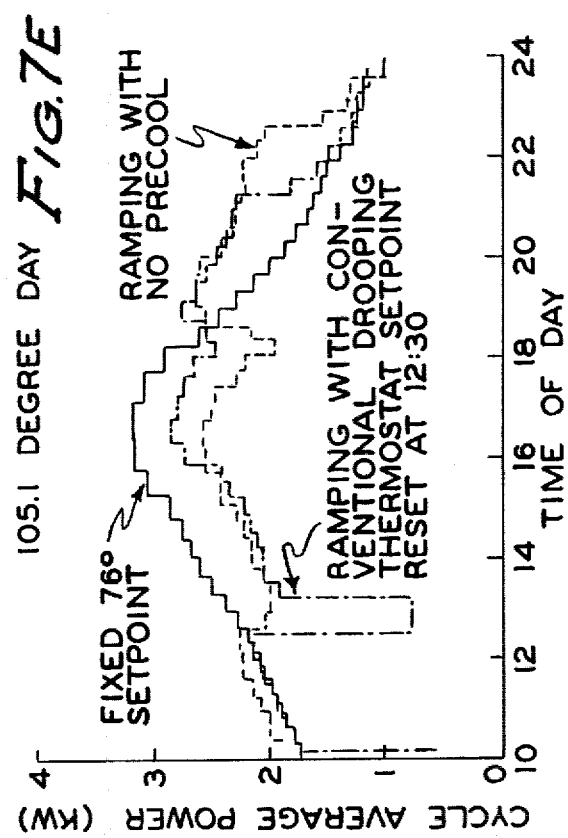

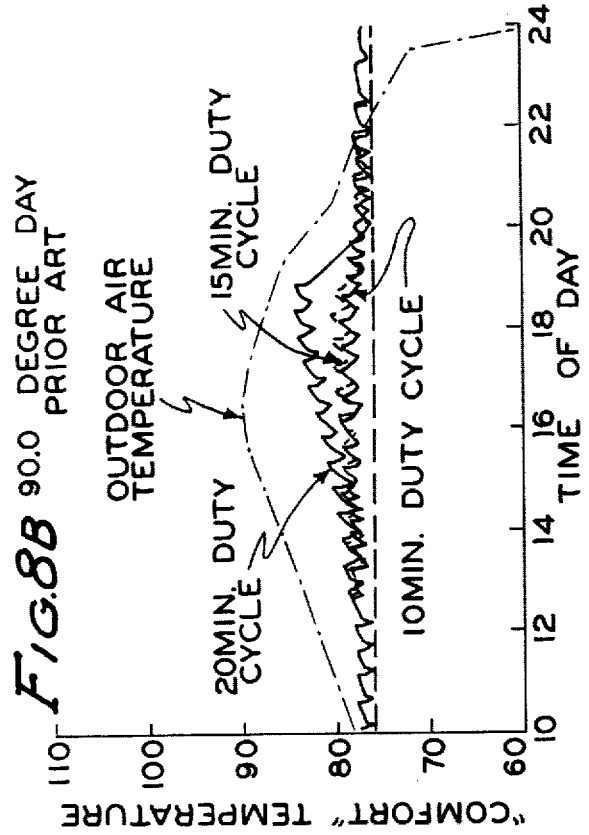
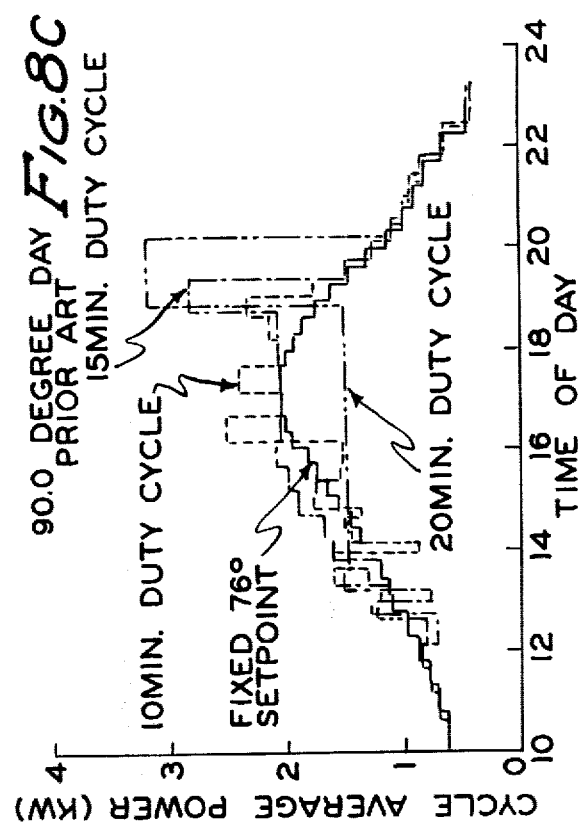
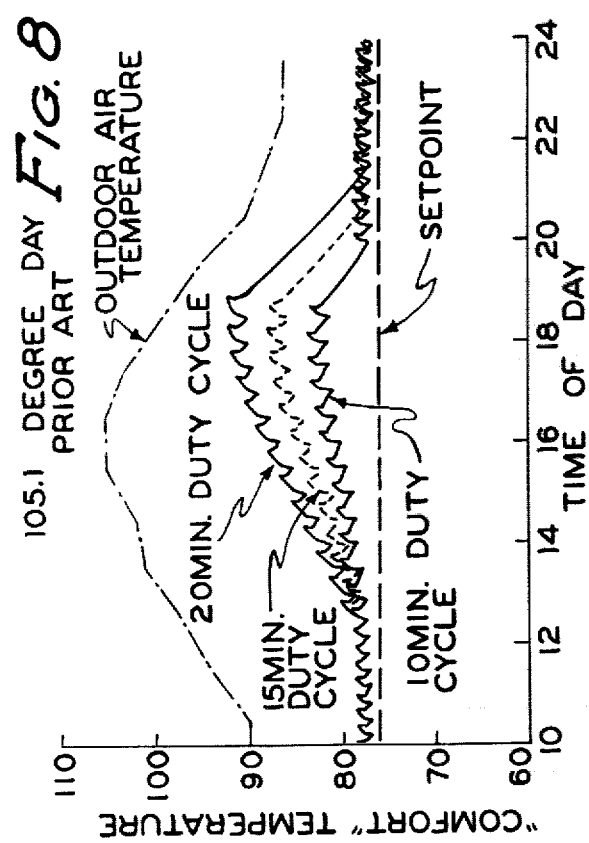
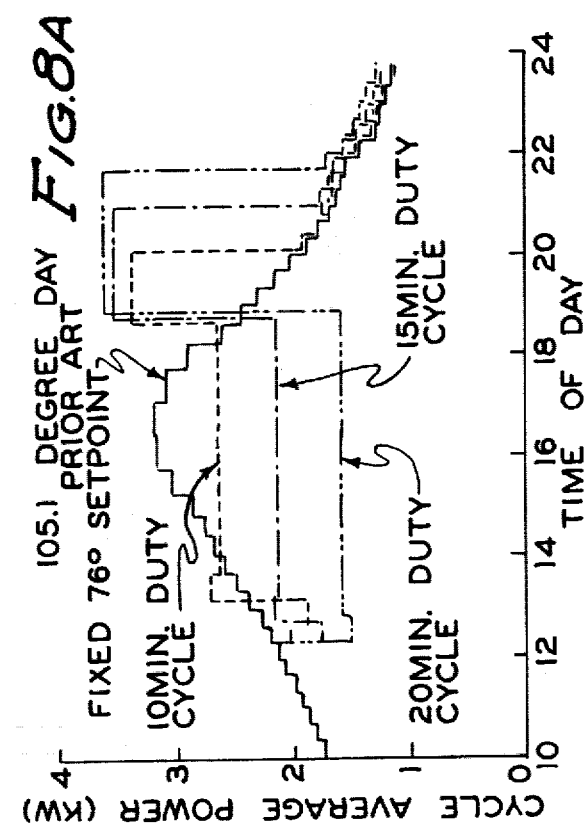

105.1 DEGREE DAY 90.0 DEGREE DAY

METHOD AND APPARATUS FOR POWER LOAD SHEDDING

BACKGROUND OF THE INVENTION

1. Field of the Invention

The present invention relates generally to a method of controlling the peak power demand in an electrical power distribution network by controlling the peak power consumption of individual loads such as air conditioning loads and, more particularly, to a method and apparatus for controlling the thermostats of individual space conditioning apparatus in a predetermined manner based on external commands.

2. Description of the Prior Art

One of the most serious problems confronting electric utility companies today is the great variance in total electrical demand on a network between peak and off-peak times during the day. The so-called peak demand periods or load shedding intervals are periods of very high demand on the power generating equipment where load shedding may be necessary to maintain proper service to the network. These occur, for example, during hot summer days occasioned by the widespread simultaneous usage of electric air conditioning devices. Typically the load shedding interval may last many hours and normally occurs during the hottest part of the day such as between the hours of noon and 6:00 p.m. Peaks may also occur during the coldest winter months in areas where the usage of electrical heating equipment is prevalent. In the past, in order to accommodate the very high peak demands, electric utility companies have been forced to spend tremendous amounts of money either in investing in additional power generating capacity and equipment or in buying so-called "peak" power from other utilities which have made such investments.

More recently, electric utility companies have turned to load shedding as a means of controlling peak demand and this has led to the use of the term "load shedding interval." It is desirable that a load shedding device reduce power demand uniformly over the entire load shedding interval because the actual peak of power demand on the total utility grid could occur at any time during the load shedding interval.

In the prior art, several basic strategies and devices have been utilized for load shedding in order to limit the peak power demand on the power generating capacity of electric utility companies. One such mode involves sending signals either over the power lines or by utilizing a radio-type signal emanating from the utility to disconnect or interrupt the use of certain selected electric loads such as air conditioning compressors when the demand has reached a certain point. While this type of direct control of power consumption by the utility achieves usage cutbacks during peak periods which prevent the power network from becoming overloaded, in many cases, the great inconvenience to the user who may find his power disconnected for an inordinately long time may well outweigh the benefits of the load shedding.

An alternate method of control employed by utility companies to reduce peak power consumption on given networks involves the concept of duty cycling. This involves a time sharing over the network of certain amounts of the power during peak periods such that service is interrupted to selected devices on a time sharing basis. Thus, for example, on a ten minute per one-half hour duty cycle, all of the devices for which service is to be interrupted have their service interrupted ten minutes out of each one-half hour on a rotating basis with each ten minutes involving one-third of the device population. While this method does accomplish some load shedding, it has several disadvantages.

First, duty cycling tends to destroy natural diversity. Natural diversity may be defined by the following. A large group of air conditioning or heating machines which continually cycle ON and OFF to maintain comfort conditions in a space have a natural tendency to operate such that the cycling pattern of each machine is in random phase with the cycling pattern of all other such machines in the power network. In this fashion, there is but a random likelihood that all of the air conditioning compressors or heating machines will be operating at the same instant. The tendency for this random operation is then called natural diversity. Any load shedding strategy which tends to synchronize the running periods of all the compressors or heaters in the utility service network reduces natural diversity. Synchronization causes significant spikes in power demand during the on cycles of these devices and negates much of the benefits of the load shedding. If the devices to be interrupted are electric air conditioning and cooling units, for example, the chances are that all such units whose power supply has been interrupted will be calling for power at the end of the off cycle such that a spike in power demand will occur upon switching of the interrupted units at the end of each cycle.

Also, this method of load shedding may be defeated or overcome by the customer by the installation of an oversized air conditioning or heating unit such that it may maintain the temperature of the environment utilizing only that portion of time allotted to it. The net effect, of course, is that no real power is shed.

The general problems associated with all such prior art methods and devices is that while they may accomplish a certain amount of load shedding which benefits the electric utility, they largely ignore a very important factor—the impact of one or more modes of interrupted service on the customer or user. Abrupt or large changes in the environmental temperature of a conditional space are very undesirable from the standpoint of the customer.

Other prior art methods of load shedding include the timed resetting of thermostats to a higher setting in the summer during the air-conditioning season and to a lower setpoint during the heating season for a specified period or number of hours during the peak demand part of the day. This step change does result in a great deal of load shedding insofar as power utility is concerned. However, again it represents an abrupt change in the temperature of the environment which is sensed by the inhabitants who are required to endure uncomfortable temperatures for this lengthy period of time. What has long been needed is a device which can achieve the required network load shedding with a minimum impact on occupants of the conditioned space.

SUMMARY OF THE INVENTION

By means of the present invention, the ability to control electrical power network peak load is achieved with a minimum impact on the comfort of individuals in the conditioned space. The present invention contemplates the control of power consumption in individual space-conditioning loads fed by an electrical power network by means of a commandable, programmable temperature control device which gradually changes the control setpoint in a predetermined manner in response to an external signal such that temperature changes go relatively unnoticed by the customer. In the cooling mode, the temperature control setpoint is slowly raised in a substantially continuous manner or "ramped" upward to a predetermined maximum temperature limit during peak power consumption hours and, thereafter, ramped back down at a fixed rate until the conditioned space is returned to its original temperature at which point control is returned to the user and the normal manually adjustable thermostat mode. Conversely, in the heating mode, in response to an external signal the setpoint is ramped downward to a predetermined minimum temperature limit during peak power consumption hours and, therafter, ramped back upward to its original setpoint after the peak power consumption hours have passed such that control is then returned to the user and the original control mode. In the case of air conditioning, the amount of load shedding may be somewhat enhanced by initially precooling the environment several degrees prior to starting the upward ramp cycle and, in the heating mode, the environmental temperature may be raised several degrees prior to the ramping down of the setpoint. This adds additional potential dynamic load shed.

The entire load shedding operation may be accomplished electronically. A radio receiver or other such means is utilized to receive a signal from the power utility company. In response to the signal, the setpoint function of the thermostat associated with such load becomes an electronically simulated function in accordance with the present invention and the user-controlled setpoint is removed from the control loop. The effective load shedding is also greatly enhanced by the provision of an integral reset function in addition to the conventional proportional control within the temperature control system. This enables the thermostat to control the conditioned space at a temperature closer to that of the setpoint such that the best advantage may be taken of the ramping function in either the cooling or heating mode.

By means of the system of the present invention, not only in almost all cases, is more load shed during the critical peak power demand hours, but it is also done in a manner which practically eliminates the impact of physical discomfort on the persons occupying the conditioned space during the time hours the temperature is being ramped. As a guideline, it has been found that a gradual temperature change of up to about 1.5° F. goes generally unnoticed by persons in the controlled environment. This amount of ramping accomplishes a great deal of load shedding at the same time. Ramping with reference to the heating mode may be carried on up to 2° F. per hour conveniently with little change noticed by the occupants.

DESCRIPTION OF THE DRAWING

In the drawings wherein like numerals are utilized to designate like parts throughout the same:

FIG. 6 is similar to FIG. 5 but including a 3° precool period;

FIG. 6A is a theoretical plot similar to FIGS. 5A and 5B of cycle average power versus time of day with the cycle of FIG. 6 compared with the cycle of the fixed 76° F. setpoint;

FIG. 7 is a theoretical plot of a comparison between control point and fixed setpoint illustrating a typical "droop" effect in thermostats without an integral reset function;

FIG. 7A shows the same plot as FIG. 7 with integral reset control function added to the thermostat;

FIG. 7B is a theoretical plot of comfort temperature and setpoint versus time of day for the thermostat of FIG. 7 stepped up in discrete steps during the peak power interval;

FIG. 7C is similar to FIG. 7B for a ramped function using the thermostat of FIG. 7 having no integral reset;

FIGS. 7D and 7E are plots of cycle average power versus time of day as in FIGS. 5A and 5B showing comparative cycle average power usage of an air conditioning system controlled at a fixed 76° setpoint, utilizing the ramping function without a precool cycle, and having the setpoint stepped up in discrete steps each hour;

FIG. 7E is similar to FIG. 7D except the comparison is made between ramping with integral reset and ramping with a conventional thermostat not having integral reset;

FIGS. 8, 8A, 8B, and 8C show plots of theoretical temperature versus time for various prior art duty cycle modes of load shedding along with corresponding cycle average power consumption versus time of day plots for the respective duty cycling;

DESCRIPTION OF THE PREFERRED EMBODIMENT

Figure 1:
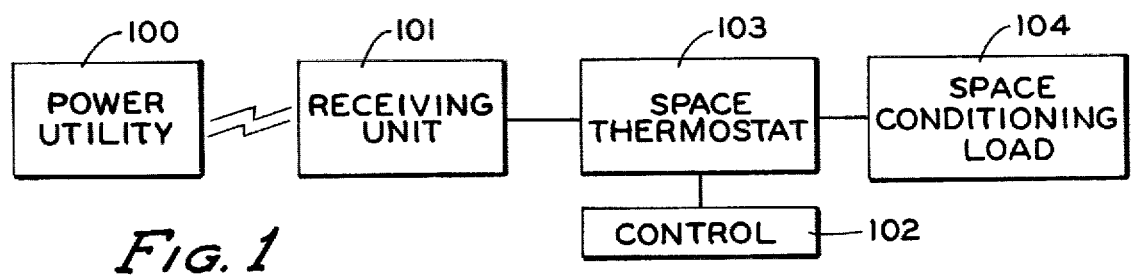
FIG. 1 is a general block diagram of the temperature control system of the invention.

The basic concept of the present invention allows an electric power utility to control individual air conditioning or heating loads within a given power network such that it may accomplish the necessary load shed commensurate with the peak power demand of the system with minimum effect on space occupants. Control by the power company may be established by a remote signalling system utilizing radio frequency, power line carrier signals or the like.

Generally, upon receipt of a command signal from the power utility, each individual thermostat controlled in accordance with the present invention has its manual setpoint control lever function overridden by another actuated control system. The initial control point or starting setpoint is normally set equal to the sensed conditioned space temperature. These two events preclude effects caused both by the occupant changing the setpoint during the load shedding period or changing the thermostat setpoint just prior to the known peak load times such as the 12:30 p.m. to 6:30 p.m. interval which is typical of the air conditioning season.

After control is assumed by the system of the present invention, the setpoint of the load shedding thermostat is ramped continuously from the initial point to a predetermined value which is stored in a microprocessor memory and which is typically 82° F. for air conditioning and 62° F. for heating. The basic ramp rates used may be given by the following formulas:

Upward Ramp Rate (Cooling) = (1)
$$\frac{82.0\ (°F.)\ \text{or Other Selected Max.} - \text{Initial Space Temp.}\ (°F.)}{\text{Load Shed Time (Hours)}}$$

Downward Ramp Rate (Heating) = (2)
$$\frac{\text{Initial Space Temp.} - 62°\ F.\ \text{or Other Min.}}{\text{Load Shed Time (Hours)}}$$

Typical Recovery Rate = (3)
1.5° F./Hour Cooling, 2.0° F. in Heating Mode

If the above ramp rate is negative, i.e., if the space temperature is already over 82° F. or below 62° F., then the rate is set to zero and nothing happens inasmuch as system has already equaled exceeded its maximum allowable comfort setting extremes with respect to the occupants of the conditioned space. If the rate is greater than maximum value per hour, it is then limited to maximum value per hour to keep the rate of warming or cooling below the threshold of awareness for most people. If the rate of the equation is between zero and maximum value per hour, the formula value is used. In this way, the setpoint is moved or ramped continuously over the entire load shedding period to affect the maximum continual load relief.

As the setpoint is ramped up or down, the space temperature sensor is continually monitored. If the sensor reads 82° F. or higher or 62° F. or lower, the ramping is again stopped because the allowable space temperature extremes are limited on both the high and low side to preserve the basic comfort of the occupants of the conditioned space. This, of course, maintains the load shedding/comfort balance in accordance with the invention.

After the predetermined load shedding period is over, the setpoint is ramped back to the original occupant specified setpoint at the constant recovery rate.

Continuous ramping of the setpoint sheds loads both dynamically and statically. The static load shed comes from the fact that the cooling or heating load is roughly proportional to the difference between indoor and outdoor air temperature. Thus, the closer the setpoint is to the outdoor temperature, of course the lower is the required load to satisfy the conditioning of the space. If this were the only mechanism of load shedding, the best strategy of load shedding would be one of the prior art's strategies, i.e., to move the setpoint directly to the maximum or minimum allowable comfort temperature and hold it there for the entire demand period. However, the static or temperature differential load shedding effect is not the only load shedding effect to be considered.

In addition to the static or temperature differential load shedding effect, there is normally a rather large dynamic load shedding effect whch comes from the cooling effect or heating effect stored in the mass of the building and its contents which can be utilized to the advantage of a load shedding situation. As the setpoint is continually ramped, the average air temperature moves up or down with the ramping. As the air warms or cools relative to the contents and structure mass, the cooler masses return stored cooling effects to the air or, conversely, the heated masses returns stored heating effects to the air. This phenomenon partially offsets the demands of the air conditioning or heating load.

If the setpoint is incremented in larger discrete steps, all this dynamic load shedding happens at once or in rather large increments. After such a step, the demand goes off completely until all the latent dynamic potential is used up for that step. At this point, the cooling or heating plant again comes on and is able to draw only upon the static load release.

As explained above, stepping the setpoint up or down in either a single or large discrete steps also has the disadvantage that it tends to destroy natural diversity and synchronize the running period of all of the air conditioning or heating loads involved in the step change. This, of course, means that when all such units are off after a step change in the thermostat setting, the demand is very low. However, at the end of this interval, a spike in demand occurs which is one of the very things the power company seeks to prevent by load shedding.

A distinct advantage of the present invention is that the continuous ramping strategy causes no loss in natural diversity of loads because the setpoint is never abruptly moved enough to cause all the air conditioners or heating units to cycle at once and thereby become synchronized.

Conversely, at the end of the critical load shedding interval, the reverse is true. Thus, if all the setpoints were again abruptly set back to the original position or stepped toward that position abruptly, a rather large spike in demand would occur causing a serious demand overshoot. This is prevented in accordance with the present invention by causing the temperature setpoint to be ramped back to the original setpoint at the fixed predetermined rate.

At the end of the period of peak power demand, the static load relief has reached its maximum. When the setpoint begins to ramp back to the original setting, of course, the dynamic load relief which had been added to the static load relief during the peak power demand period must be recovered. However, by allowing it to be recovered at an off peak period, the total power demand on the network never exceeds capacity. Thus, whereas other power load shedding techniques may ultimately reduce the total power consumption an amount equal to that of the present invention, none combine dramatic peak period load shedding with occupant comfort control as does that of the present invention.

A more detailed description of a preferred embodiment of the present invention is given in conjunction with the drawings. It is understood, of course, that the system applies equally as well to electric heating systems during the winter months as to air conditioning systems in the summer months. However, peak power demand problems associated with widespread use of electric air conditioning are universal throughout the country, whereas, electric heating, while more prevalent in Europe, is generally localized to portions of this country where other forms of central heating are less economical.

In the drawings and, in particular, FIG. 1 thereof there is shown a general block diagram of the system of the present invention. This includes the controlling electric power utility represented by 100 which communicates with the load shedding system, as by remote radio signal or the like, through a signal receiving unit 101. In the case of an air conditioning compressor, the receiving unit may be located outside of the building structure in the vicinity of the compressor. Responsive to the command of the power utility, the load shedding control 102 establishes control over the internal space conditioning thermostat 103. This, in turn, controls the electrical space conditioning load 104.

Figure 2:
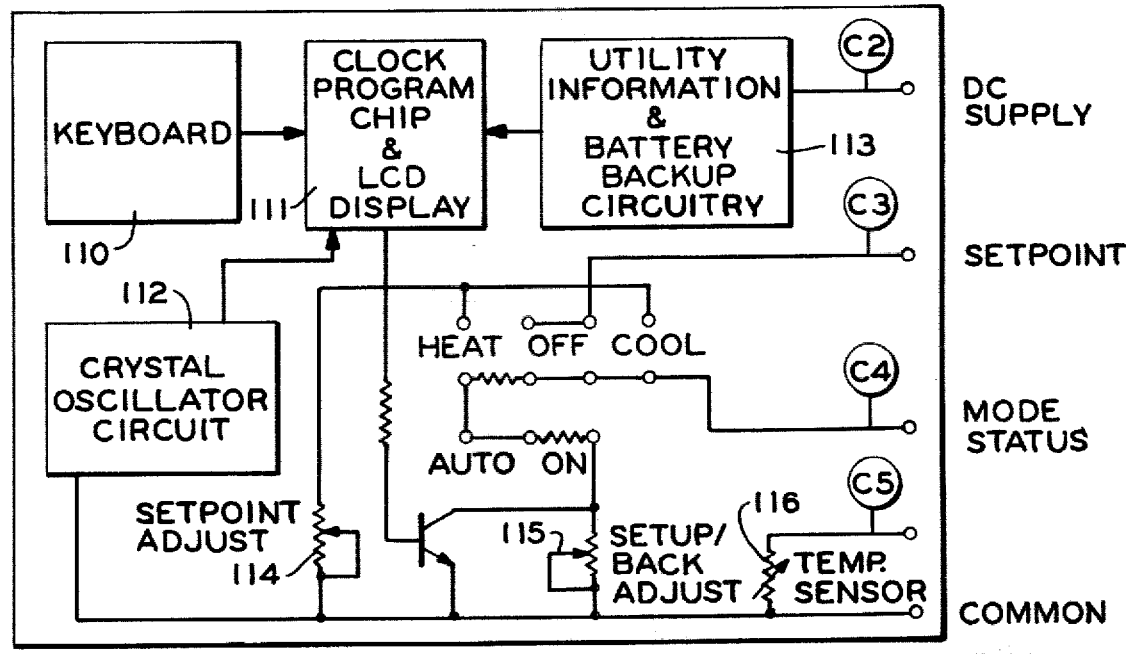
FIG. 2 includes schematic diagrams of an external time clock and typical thermostats which may be used with the system of the invention.

FIG. 2 depicts two space thermostats which are adpated to connect with the control system of FIGS. 3 and 4, 4A and 4B. The space thermosat labeled Thermostat A is one typically designed for use in a residential environment in accordance with the present invention. That thermostat is a basically solid state control device which includes a keyboard 110 through which data may be entered into a clock program chip 111 which may control an LCD display. Time is kept by a crystal oscillator circuit 112. Utility information and battery backup circuitry are indicated at 113. Other common thermostat functions provided include a manual setpoint adjust as at 114, a manual setup/back adjust for automatically timed energy saving as step changes such as night setback at 116 and an environment or room temperature sensor 117. Mode selection designations for heating, off, cool, and the status as to whether the associated circulation fan is under automatic control or the ON mode are also provided. Electrical conductors which coordinate with FIGS. 3 and 4 include DC supply line C2, setpoint connection C3, mode status connections C4, and temperature sensor connections C5, respectively, and a common line.

The second space thermostat, Thermostat "B," is a typical commercial version. Thermostat "B" like the residential Thermostat "A" has heat off and cool modes and fan or blower control which can be operated on an ON or automatic status. Thermostat "B" also includes a separate manual heating setpoint adjustment lever as at 120, and cooling setpoint adjust at 121. A room temperature sensor is shown at 122. A light emitting diode as at 123 is utilized to indicate when the particular thermostat is under the control of the utility during the load shedding interval. The thermostat has conductors like those of thermostat A which coordinate with FIGS. 3 and 4, 4A and 4B at C2, C3, C4, C5, and common.

Unlike the typical residential thermostat system, however, the typical commercial thermostat system has an external time clock as at 125 for controlling setup and setback functions. This is shown connected at C1.

Figure 3:
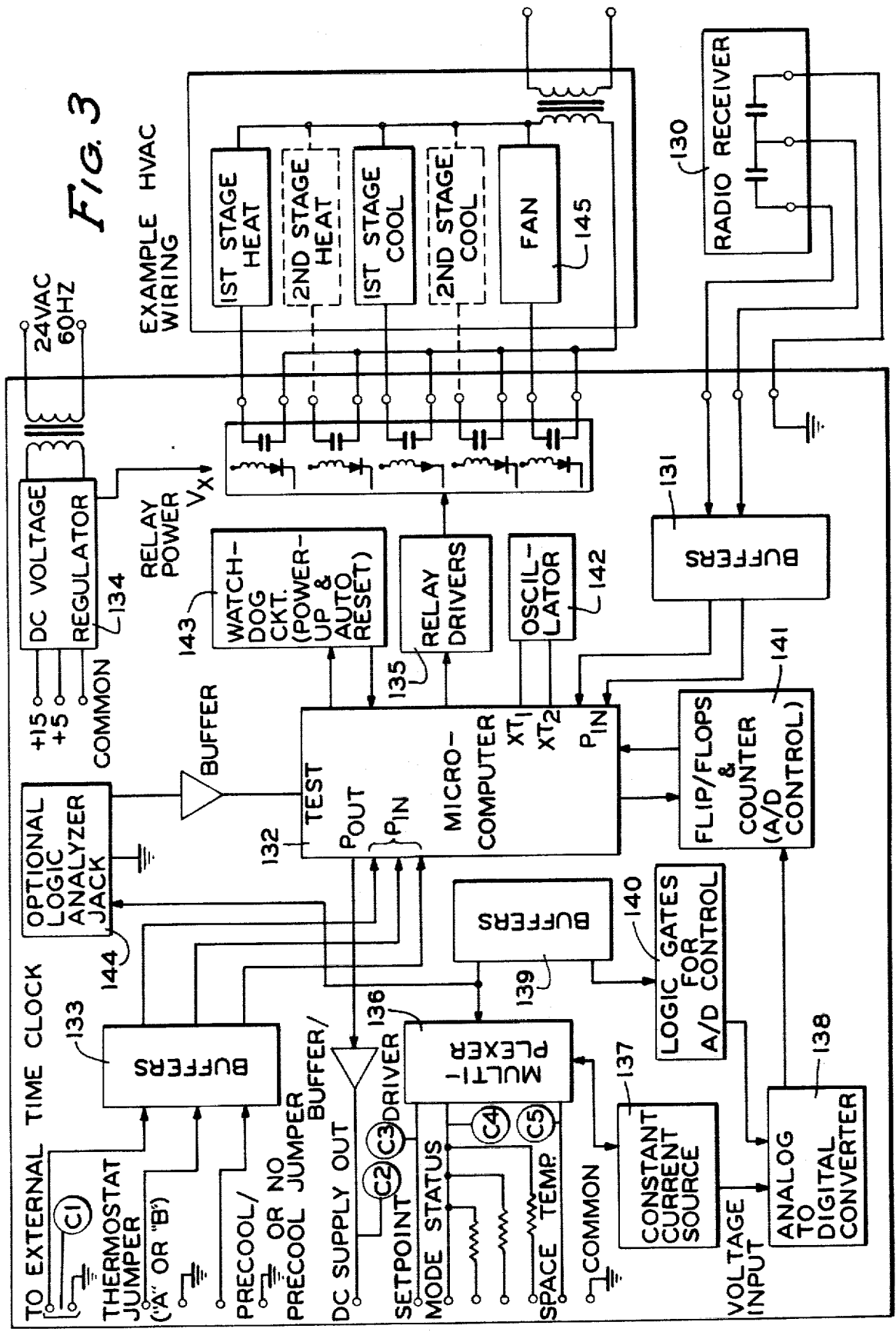
FIG. 3 is a schematic block diagram of the thermostat control system of the invention.

FIG. 3 depicts a schematic block diagram of the thermostat control system of the invention which connects to the thermostat to be controlled. The system includes a remote control input receiving unit such as a radio receiver depicted at 130 with associated radio receiver buffers indicated by 131.

The illustrated conductors C1–C5 associated with thermostats A and B and the external clock 125 of FIG. 2 continue at C1–C5 of the diagram of FIG. 3. The control system of FIG. 3 may be integral with or located separately from the associated thermostat shown in FIG. 2.

The connections C1 connect the external time clock with the system microprocessor 132 through input buffers 133. The "thermostat jumper" connection "A" or "B" is a permanent internal jumper which is connected for either a typical residential or commercial thermostat when the use of the system of FIG. 3 has been determined. An additional jumper may be used to select whether or not precooling will be utilized in conjunction with the ramping load shedding strategy of the invention. Inputs indicative of the type of use and whether or not precooling/preheating is desired also become inputs to the microprocessor 132 through the input buffers 133.

The DC supply from the regulated DC voltage source 134 is supplied to a designated thermostat as controlled by the microprocessor 132 through the DC supply line C2. The power source is also utilized to control the various power and fan relays of FIG. 3 as controlled by the microprocessor 132 through relay drivers 135 in a well known fashion.

Temperature information received from the thermostat of interest which includes the value of the heating or cooling setpoint C3, the information indicating the mode status (shown in more detail in FIG. 4) is contained on line C4 and the sensed space temperature signal on line C5. This information is processed for use by the microprocessor 132 by a system which includes multiplexer 136, constant current source 137, analog-to-digital converter 138 which has additional inputs from buffers 139 and A/D control logic gates 140, and finally interfaces with the microprocessor 132 through the flip-flops and counter (A/D control) at 141. Time for coordinating the system is kept by a crystal oscillator 142.

In addition, a watchdog monitor circuit 143 is provided which assures the existence of proper input voltage power to the system and automatically resets the microprocessor if a low input voltage is sensed. The watchdog monitor also acts as an automatic reset if it is sensed that the program is not going through its normal sequence of program cycles.

The optional logic analyzer jack 144 is utilized to provide an interface between an external logic analyzer and the data bus of the microprocessor 132. For example, if desired, the contents of the RAM of the microprocessor can be made visible via a cathode ray tube. All of the functional blocks associated with the schematic block diagram of FIG. 3 are shown in greater detail in the electrical circuit diagram of FIGS. 4, 4A, and 4B.

Figure 4:
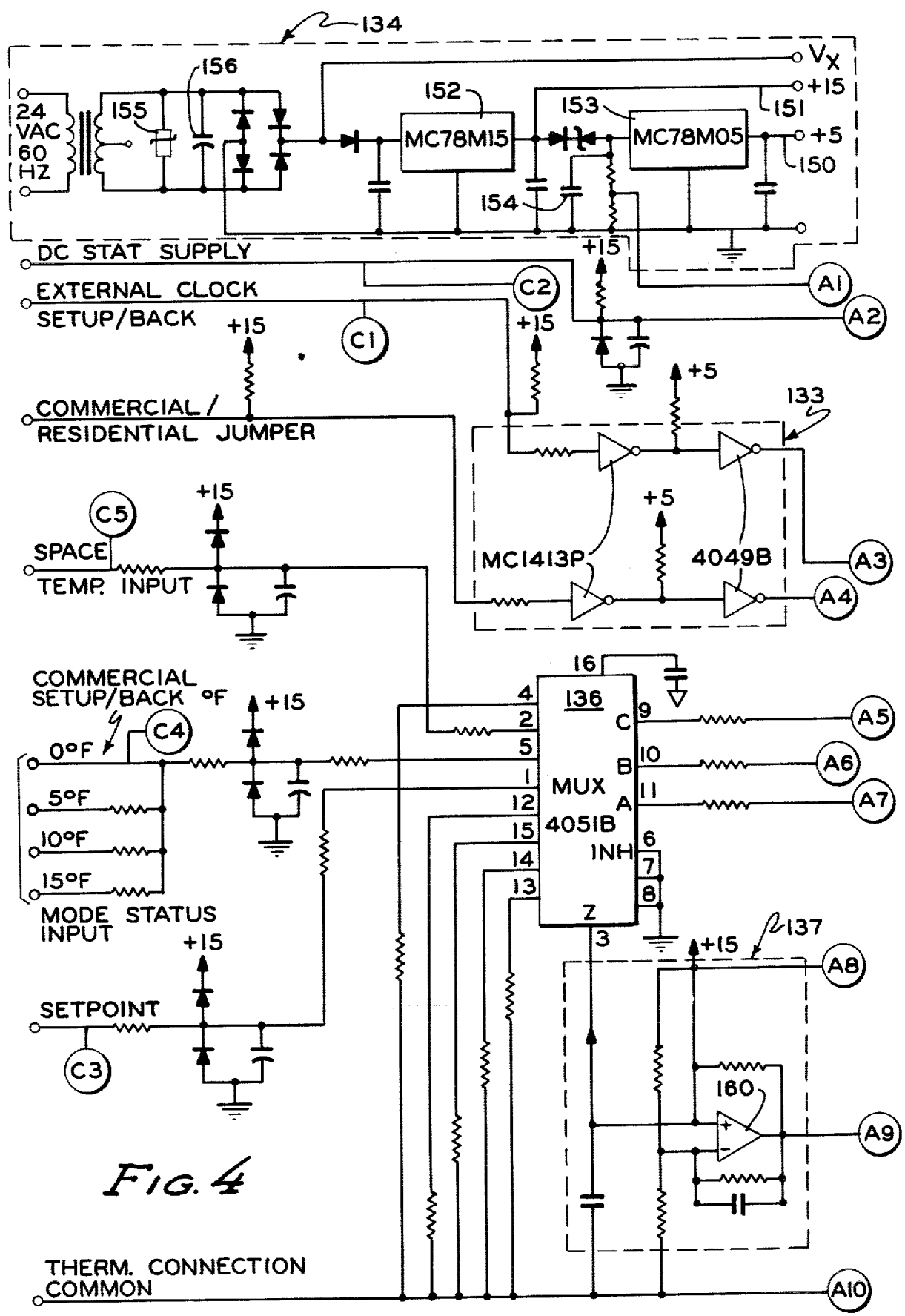
FIGS. 4, 4A, and 4B depict an electrical schematic diagram of the control system of FIG. 3.
Figure 4A:
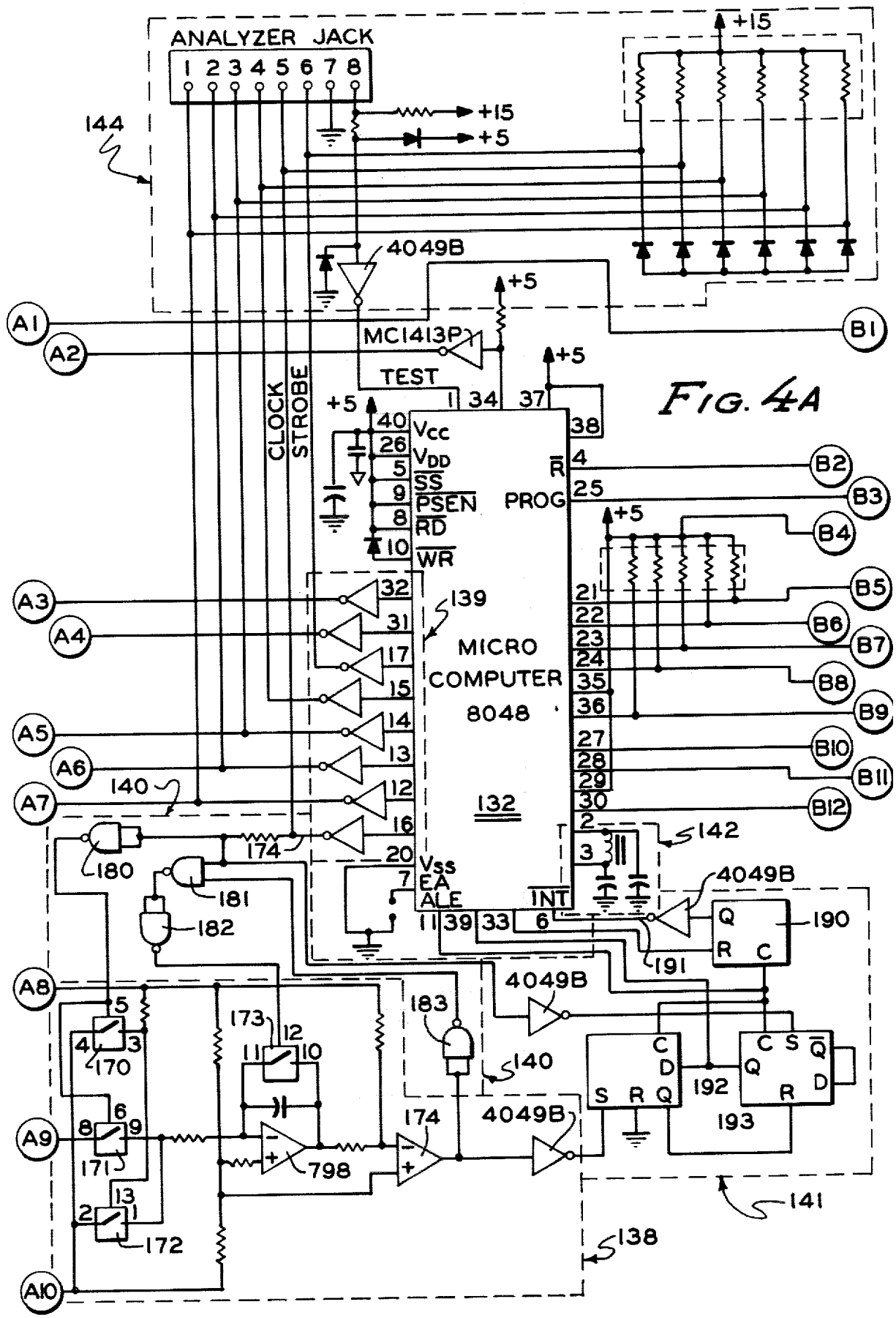
Figure 4B:
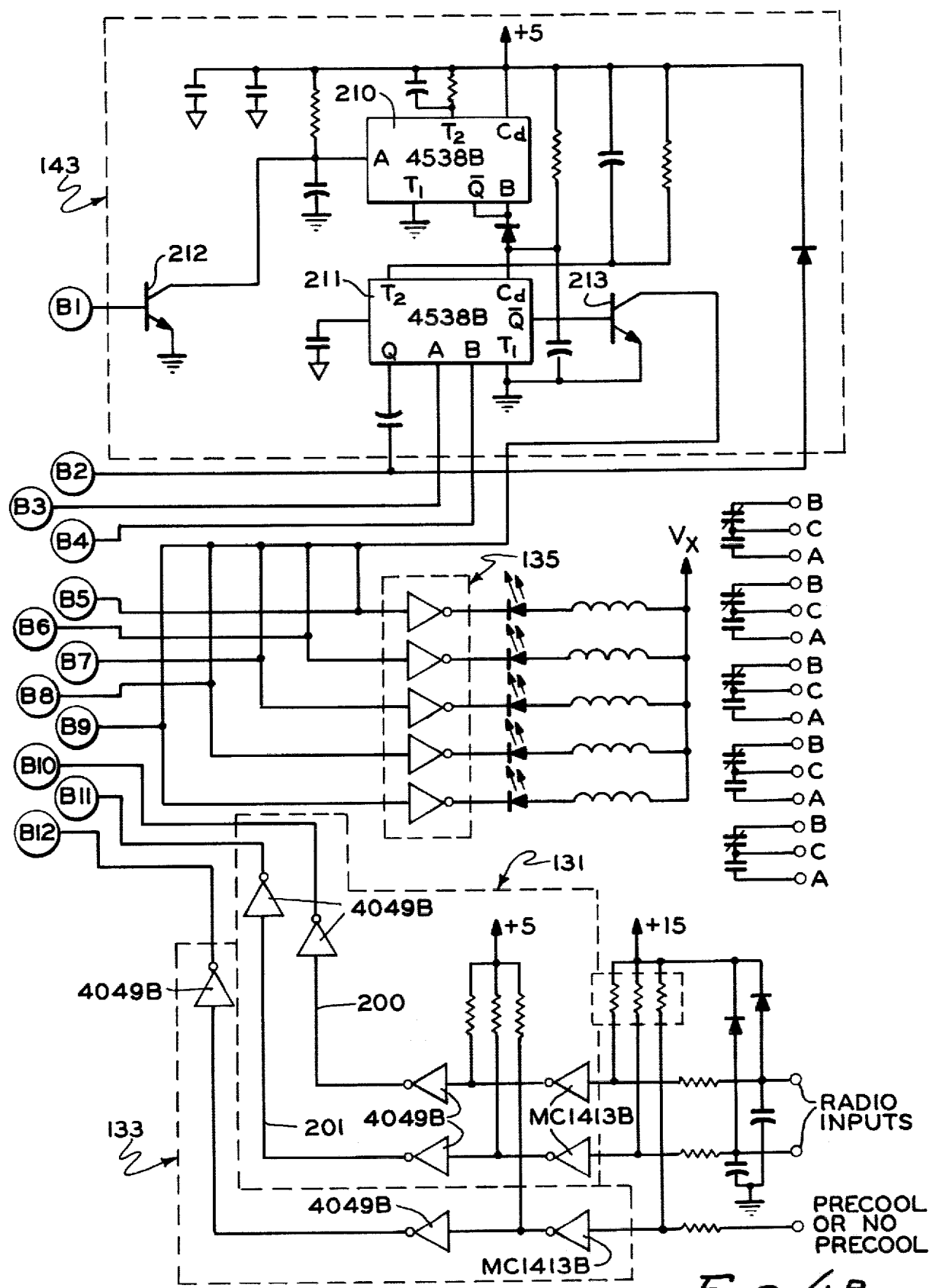

In conjunction with both the schematic block diagram of FIG. 3 and the electrical schematic diagram of FIGS. 4, 4A, and 4B, the general operation of a microprocessor controlled system of the present invention depends on the condition of various discrete, decoded, and sensed inputs. These include the input C5 from the space temperature sensor of the connected thermostat as at 117 or 123. This space temperature is typically sensed by a platinum thick-film sensor which has a characteristic resistance which varies linearly with temperature over the range of temperatures utilized. The setpoint input C3 is typically a variable resistance which may be set at the thermostat manually with reference to a dial that reads in degrees F, typically from about 45° F. to 85° F. The mode status input provides information which tells the system whether the thermostat is in the heating, off or cooling mode and whether the circulating fan switch is in the automatic or constantly running ON position. In addition, where setup/setback adjustments are not available on the thermostat involved, i.e. thermostat "B," the amount of setback selected is typically indicated by the different input lines C4 as more distinctly labeled in FIG. 4. In thermostat "A" this is a variable resistance set at the thermostat with a lever that slides from 0°-15° F.

The external clock setup/setback timing indicates information as to when the normal setpoint is to be adjusted by the amount indicated setup or setback in thermostat "B." In the case of the residential thermostat "A" the timing is done internally with the amount of setup or setback showing upon the line when this information is sampled.

The precool (preheat) is no precool (preheat) jumper, again, is another internal jumper which instructs the microprocessor whether or not the precool segments of the load shedding sequence in accordance with the present invention should be initiated when the utility controlled "Start Signal" is initially received.

The radio received utility commands include the command to start the microprocessor or the entire load shedding sequence, a recover command which indicates a return to normal control via a recovery ramp, a hold command which indicates a holding of the existing space temperature (usually occurs during a ramping interval) and an emergency off command which, in the case of a brownout or other power emergency will simply shut the power off to the heating or cooling loads.

All these signals after proper interface processing form the later basis for certain outputs from the microprocessor or microcomputer 132. The microcomputer 132 controls the relay drivers which control the heating and cooling means, i.e. furnace heating control of the air conditioning compressor control and also the fan control as shown at 145 of FIG. 3. The microprocessor also controls the supply voltage and current to operate the relevant connected thermostat through the DC supply lines C2. Signals are also sent to the thermostats which indicate to the user that the system is under utility control as indicated at utility indication 123 of thermostat "B". A truth table associated with a typical microprocessor in accordance with the present invention appears as Appendix A at the end of this specification.

The various system control blocks which have been briefly pointed out in connection with our discussion of FIG. 3 are shown in greater detail in the schematic electrical circuit diagram of FIGS. 4, 4A, and 4B. Of course, the conductors labeled A1, A2, etc., and B1, B2, etc., are intended to connected directly between the three sheets included in FIGS. 4, 4A, and 4B.

The power supply 134 is designed to transform the input voltage which is nominally 24 volt AC 60 Hz power supplied from a normal control transformer into the three working voltages of the system circuit. These voltages include regulated 5 and 15 volt supplies 150 and 151 and an unregulated relay drive voltage which is approximately equal to 20 volts. The supplies are regulated by a 15-volt regulator 152 and 5-volt regulator 153, respectively. In addition, a very large (nominally 22,000) microfarad capacitor 154 is provided at the input of the 5-volt regulator 153 so that the 5-volt supply stays regulated through power interruptions of up to one full second. Transient currents and voltages are controlled utilizing a varister as at 155 in conjunction with a capacitor 156 in a well known manner.

The multiplexer unit 136 is supplied with a constant current from the constant current source 137. The constant current is nominally 1.17 milliamps to the selected channel of the multiplexer which is properly addressed by the microprocessor 132. The unknown resistance at the input of the multiplexer 136 may represent either the setpoint, space temperature, or the mode status of the thermostat is converted to an unknown voltage at the output of the operational amplifier 160 of the constant current source 137.

The analog-to-digital converter unit 138 includes four solid state switches 170, 171, 172, and 173 which are controlled by the microprocessor through a bus output 174 at pin 16 by the microprocessor 132. These switches are also controlled in conjunction with logic gates 180, 181, 182, and 183 associated with the A to D control logic 140. These gates also operate through line 174 in conjunction with the output of the comparator 175. The output of comparator 175, in effect, tells the rest of the circuit when each A/D cycle is completed.

Each A/D cycle begins with the output of the microprocessor at pin 16 (line 174) going high. This signal closes the appropriate switches so that the unknown voltage is integrated for a known period of time. After this period of time, the output of pin 16 at line 174 goes low so that the integrator begins to integrate a known voltage, i.e. ground. Thus, a known slope is initiated in the direction opposite from that initiated in reference to the unknown voltage. This continues for an unknown period of time until the output of the integrator reaches a voltage level at which the whole cycle started, at which point the integration shuts itself off for that cycle.

The unknown resistance is converted into the desired unit by looking at the status of a counter. This counter started from zero at the point where the A/D started the integration of the known voltage and incrementation thereof stopped when the integration shut off upon the completion of the A/D cycle. The number of counts allowed to accumulate is directly related to the unknown voltage initially integrated. Thus, the larger the resistance, the longer the interval or the greater the number of counts. This converted signal is then used by the microprocessor in conjunction with the program of the present invention.

The flip-flop and counter (A/D control) 141 operate in conjunction with the A/D timing sequence. The counter 190 simply designed to interrupt the microprocessor every 1012 counts of the output clock which connects with the microprocessor on line 191. This reestablishes the program of the microprocessor into a regular cyclical routine in a well known manner. The flip-flops 192 and 193 perform a division by three routine counts of the counter 190 and feed every third pulse into the counter which in turn holds the number which is eventually converted into the desired units.

The buffers shown at 131 of FIG. 3 include the radio input buffers associated with the radio input signals on lines 200 and 201. Thus, the radio input signals are essentially fed directly into the microprocessor 132 through the buffers, such that when the input port is tested by the program, appropriate action can be taken. The inputs on these lines can only be high or low, not continuous, as is the case for the multiplexed inputs which were discussed in reference to the A/D conversion. The two radio inputs are capable of delivering form commands such as binary commands which are simply whether or not the relay contacts on the external receiver are opened or closed. The effects of the form of the command is made compatible with and under the control of the particular power utility involved as discussed in greater detail below.

As previously discussed, the commerical/residential jumper tells the microprocessor which thermostat is connected to the system. Normal program operation differs between the residential and the commercial thermostat. For example, the setup/setback °F amount indicated in FIG. 4 is in line in the case of the residential thermostat only when selected and it is always in line but only used when the external clock contacts are closed in the case of the commercial thermostat.

The watchdog monitor circuit 143 serves a dual function. It operates both as an automatic reset to the microprocessor if a low input voltage is sensed and, in addition, also acts as an automatic reset system if it is sensed that the program for some reason is not going through its normal sequence of program cycles. The main component in the circuit is a dual one-shot integrated circuit including one-shots 210 and 211. In normal operation, both the clear pins of the one shots are in the "high" position indicating that no reset is necessary and the low voltage detect transistor 212 (FIG. 4A) is "on" which keeps the input at pin A of one-shot 210 low.

If for any reason the input voltage through the 5-volt regulator 153 drops below seven volts, the transistor 212 turns off which forces the A input to the one shot 210 to go high. This triggers the $\overline{Q}$ output of the one shot 210 to pulse low which, in turn, pulses the reset of clear pin of the one shot 211. This forces a Q output of the one shot 211 to go low and reset the microprocessor via line B2 which enters the microprocessor at the reset pin 4.

At the same time the Q output of the one shot 211 is low, the $\overline{Q}$ output of the one shot 211 is high which turns on the transistor 213. This transistor draws the current which would otherwise turn the relays on during a power-up situation. This situation exists because a characteristic of the microprocessor is that, during a reset condition, all ports are initialized high which normally is the state that would turn on all the control relays.

The circuit that controls the reset when the program malfunctions samples the output of the "PROG" pin 25 of the microprocessor 132. This pin is normally low and is pulsed every time the microprocessor program goes through a new sequenced cycle. If these pulses do not routinely come, the Q output of the one-shot 211 returns to the low state and resets the microprocessor.

The output relays are controlled by the relay drivers 135 in a well known manner in conjunction with the outputs of the microprocessor which feed into the relay system. These, of course, control the power to the loads involved.

The Thermostat Jumper "A" or "B" indicated in FIG. 3 corresponds to the commercial/residential jumper input of FIG. 4. Inasmuch as the system of the invention is designed to be compatible with either commercial or residential thermostats, the jumper is provided internally in the processor unit to tell the microprocessor in fact which type of thermostat is connected to the system. This is necessary because the microprocessor program expects different inputs and gives correspondingly different outputs depending on whether it is connected to a commercial thermostat or residential thermostat. This, of course, facilitates ease of interchangeability in application for the control system of the invention.

As previously discussed, the device of the present invention must execute a controlled set point ramping from the sensed temperature level at the start of the load shedding interval to the upper comfort limit of 82° F. or 62° F. upon cooling. It is well known that thermostats without an integral reset function tend to control the conditioned space temperature off of the control setpoint as much as two or three degrees. This normal characteristic is inherent in the steady state operation of proportional controls as well as on-off controls such as room thermostats. In the cooling mode, then, such a controller tends to allow the temperature to drift upward and be controlled somewhat above the setpoint as shown and discussed below in regard to FIGS. 7, 7B, and 7C. In the heating mode, the reverse is true and the space temperature tends to be controlled at a point somewhat below the room thermostat setpoint.

Because the load shedding strategy of the present invention involves moving the setpoint over a discrete range during a discrete interval of time, in conjunction with limiting itself to a maximum change in the temperature of the conditioned space to provide greater comfort to the occupants, the drooping characteristic tends to limit the load shedding relief afforded by the strategy by narrowing the band of temperature change available to it. Under normal circumstances, the droop error can be compensated for by simply manipulating the setpoint such that the space temperature is actually controlled at the desired temperature with the setpoint somewhat offset from the desired value.

With the present invention, it is desirable that the actual conditioned space temperature coincide as much as possible with the setpoint temperature so that the maximum temperature change range is available to the load shedding strategy. Thus, the preferred embodiment in addition to the normal proportional control afforded by a typical space conditioning thermostat also employs an integral reset function in arriving at the electrical signal which represents the sampled setpoint at any given instant in time. This integral reset is incorporated into the program of the microprocessor 132 which is also given in Appendix A.

The operation of the integral reset function in a control system is well known in other art applications and need not be discussed in detail here. An excellent explanation of both proportional and proportional plus integral control systems is found in a standard textbook on the subject such as Raven, Francis H., *Automatic Control Engineering*, McGraw-Hill Book Company, New York (1968), pp. 89-110.

In conjunction with the operation of the load shedding device of the present invention, certain parameters are normally arbitrarily selected and fixed within the microprocessor 132. These may be represented by the following:

| Parameter | Cooling Mode | Heating Mode |
|---|---|---|
| 1. Upper Temperature Limit | 82° F. | Original Set Point |
| 2. Lower Temperature Limit | Original Set Point | 62° F. |
| 3. Maximum Deviation from Starting Space Temperature | 9° F. | 9° F. |
| 4. Hours for Load Shed Ramp | 6 Hours | 4 Hours |

-continued

| Parameter | Cooling Mode | Heating Mode |
|---|---|---|
| 5. Maximum Rate of Change | 1.5° F. Per Hour | 2.0° F. Per Hour |
| 6. Recovery Rate of Change | 1.5° F. Per Hour | 3.0° F. Per Hour |
| 7. Maximum Precool or Preheat | 3° F. | 4° F. |
| 8. Rate of Preheat or Precool Ramp | 1.5° F. Per Hour | 2.0° F. Per Hour |

Other parameters may be determined for certain models having specified applications as desired.

In normal operation, the particular power utility involved initiates a utility command signal which, in the preferred embodiment, is a radio signal which initializes the system. This is known as a "Start Shed" or "Resume Shedding" Operation signal. This signal is carried from the radio inputs along lines 200 and 201 as indicated in FIG. 4B to the microprocessor which then responds to the start command. Immediately, the current space temperature value is monitored through the line C5 and stored in memory. In addition, through the microprocessor through the inputs and outputs begins to continually monitor the status of certain parameters including the positions of various system switches, selectable jumpers such as the jumpers involved in determining whether a residential or commercial thermostat is being used whether precool or preheat are being used, etc. Space temperatures are continually monitored, radio command inputs and, in the case of the commercial thermostat, the external time clock relay is continually monitored. In addition, any manual setpoint changes are ignored.

If the status of the mode switch is on "Cool" and precool is not selected, the system then remains under user control for the two hour precool period and there is no indication of utility control during that period. After the precool period has passed, the base temperature is again sensed and stored and the ramp rate is determined by taking the difference between the limited maximum temperature, i.e. 82° F., and the space temperature in determining the rate at which the setpoint must be increased in order to reach the maximum allowable temperature at the end of the load shedding interval. If the ramp rate determined is less than the allowable maximum per hour, the actual calculated rate is used. However, if the determined rate is higher than the maximum per hour, the maximum per hour rate is used over the load shedding interval. At the end of the load shedding interval, the recovery portion of the cycle is initiated either by the internal program or by a new external command by the power utility in which the control setpoint is again slowly ramped down at the recovery rate until the value of the original prerecorded setpoint is reached.

If the precool jumper is in the position such that precool is added to the ramping cycle, as soon as the system is initialized by the signal from the power utility, the setpoint begins ramping down at 1.5° per hour for the 3° F.-two hour precool. After the precool period, the cycle operates as in the case of the no-precool sequence.

In the heating mode, the temperature is ramped downward toward a limit rather than being ramped upward and the precool period becomes a preheat period in which the temperature is ramped up before being ramped down.

At the end of the recovery cycle, when the existing setpoint is reached or the space temperature that was stored at the beginning of the utility control cycle is reached, the utility indication turns off and control of the system is returned to the user.

If the "Start Shed" signal is received after an interruption other than the normal cycling sequence, the space temperature originally recorded in memory is utilized and the ramping function is resumed or continued in the appropriate direction from which it was moving at the time of the interruption.

In addition to the normal functions of the system, an "emergency off" sequence may be provided such that, if necessary, the utility may shut all the loads off on an emergency basis. Thus, if the emergency off message occurs while the system is under the control of the user, the system of the invention immediately shuts off all the power relays, except the fan relay, such that the space conditioning load is completely off. This status is held for the duration of a command or until a different command is received from the power utility.

If the emergency off occurs when the system is under the command of the load-shedding apparatus, the reference temperature stored at the beginning of the load-shedding cycle is retained and all power relays are opened such that the entire load is disconnected. This status is also retained for the duration of the command or until a different command is received from the utility.

A start command following an emergency off command is treated as a normal start command if the system has been under user control. However, if the system was under utility control and it was, in fact, already pursuing its load-shedding program, the load shedding ramp is restarted based on the then existing space temperature and the originally calculated ramping rate. To protect the occupants, if the system has drifted beyond the limits while in the emergency off mode, it controls at the predetermined temperature limit and holds there until the time for the normal recovery ramping is reached.

The system can also be made responsive to a "hold" command. Under the hold command, the existing space temperature becomes the control temperature for the duration of the command. The previously stored reference temperature is retained as the future ramp rate reference point.

Of course, if desired, other command sequences can be contained in any particular embodiment of the present invention without deviating from the basic load-shedding strategy.

The electrical components utilized in the diagrams of FIGS. 3 and 4 are standard components available from various manufacturers. Certain parts not labeled on FIGS. 3 and 4 include:

| Reference Number | Component |
|---|---|
| 132 | 8048 Microcomputer |
| 135 | MC 1413P Dual Buffer Array |
| 139 | MC 1413P Dual Buffer Array |
| 160 | 798 Dual Op-amp |
| 170–173 | 4066B Quad Switch |
| 175 | 798 Dual Op-amp |
| 180–183 | 4011B Quad NAND Gate |
| 190 | 4020B Counter |
| 192, 193 | 4013B Flip-flop |

FIGS. 5–9 represent theoretical performance plots depicting and comparing the load shedding method of the present invention with that of a fixed setpoint or certain prior art load shedding methods in a manner which reveals both the effect on the conditioned space and the theoretical load shed accomplished by the various methods. The plots are theoretical and were produced using a digital simulation of a 1440 square foot building. The building model was a typical California-style residential home using typical construction for that part of the country. The particular type home was chosen because that part of the country represents one in which load shedding is presently of a primary concern to the power utility companies.

In the model chosen, the house was built over a crawl space having stuccoed exterior walls and an attic having an uncooled crawl space. Assumptions were made that the walls contained 3½ inches of fiberglass insulation, the roof 6 inches of fiberglass insulation, and single pane windows were assumed. The absorption of the roof was assumed to be 50 percent. The air conditioning system for the home had 3 tons of nominal cooling capacity.

The outdoor weather conditions on the graphs utilized 105.1 or 90° days are based on actual weather data from a local weather bureau in Fresno, Calif. in August, 1965.

The other assumptions made were typical for such building construction. The attic crawl space was assumed to be heated indirectly by the solar flux on the roof surface. The distribution ducting was located in the attic crawl space and heat flow from the crawl space into the ducting was simulated. The building had approximately 25 percent of its exterior walls in windows and doors and the solar flux was assumed to penetrate the window openings. Overhanging eaves were modeled around the perimeter of the roof and the resulting shadows affected the solar flux on the walls and windows. A constant infiltration rate of one air change per hour was assumed for the conditioned space and that for the attic crawl space and the floor crawl space were chosen at typical values for natural ventilation of such areas. Radiation heat exchange between the interior wall surfaces and floor and ceilings was also modeled.

In order to more carefully evaluate the value of the dynamic load shedding, much care was taken in assuring correct calculation of the internal thermal mass and the thermal mass of the structure. Each wall surface was broken down into its constituent construction materials and modeled by a separate thermal resistance appropriate to each material. The thermal mass of each layer of each wall was modeled by a thermal capacitance and a differential equation according to the thermal capacitance was written for each thermal mass in the structure. These differential equations represent the storage of energy within the structure and content of the building. Approximately 25 ordinary, linear differential equations were required to simulate the building modeled.

The air conditioning plant was a Lennox 3 ton central air conditioning system with a separate outdoor condensor and indoor evaporator. The model of the air conditioner was a non-linear curve of the performance data available from the manufacturer's literature. Thus, the power required in the cooling capacity varied with indoor and outdoor air temperature conditions and the capacity of the air conditioner for latent cooling was also simulated thereby accounting for the effect of moisture buildup within the conditioning space.

The thermostats (both conventional and commandable) utilized were modeled in a manner which included all internal dynamics. The thermostat model required two ordinary differential equations to simulate its behavior. In the model of the building, the thermostat as well as the air conditioning plant were combined to form a complete system of differential equations. In this manner, the complete interactions of the building, control system, air conditioning plant, and the outdoor weather conditions were properly modeled.

Such techniques have been used by the assignee of the present invention successfully in designing other control systems and in simulating other model conditions.

Figure 5:
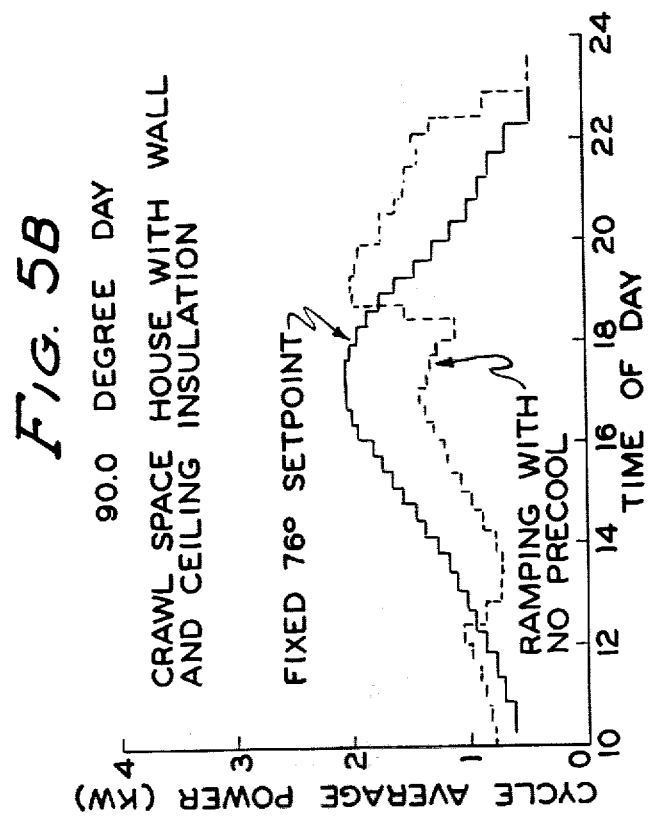
FIG. 5 is a theoretical plot of comfort temperature versus the time of day for an air conditioning apparatus controlled in accordance with the invention.

FIG. 5 depicts a plot of "comfort" temperature versus time utilizing commandable setpoint control in accordance with the present invention. As used in the plots and discussion herein, "comfort" temperature is defined to be a weighted average of the indoor dry-bulb temperature ($\frac{1}{2}$) and the radiation temperature of the four walls, floor, and ceiling in the conditioned space (1/12 each). The typical sawtooth wave form is the normal variation in comfort temperature as the cooling plant cycles on and off on thermostat command about the setpoint line.

In FIG. 5, the setpoint is held constant at 76° F. until 12:30 and thereafter continuously ramped upward at approximately 1° F. per hour until 6:30. At 6:30 the setpoint is then ramped downward at 1.5° per hour until the original 76° setpoint is reached. A comparison with outdoor temperature is also shown.

Figure 5A:
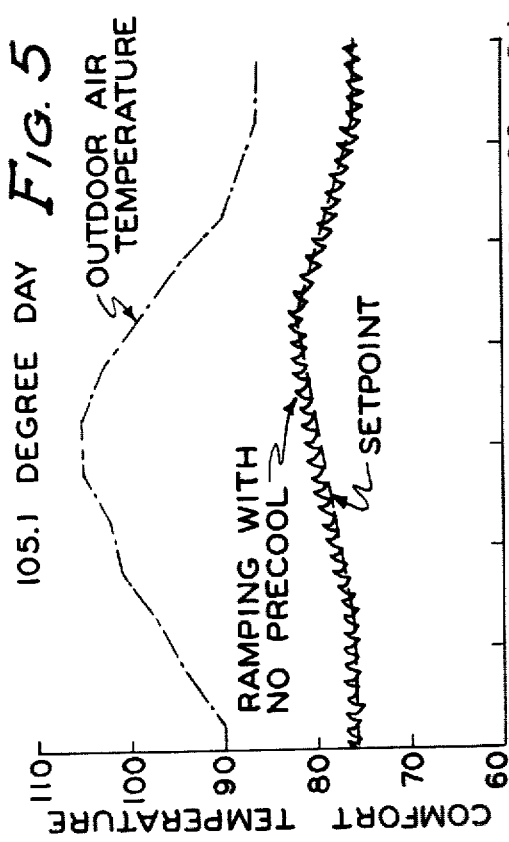
FIGS. 5A and 5B depict theoretical cycle average power consumption versus time of day plot for an air conditioning system comparing results between a thermostat having a fixed 76° F. setpoint and one controlled in accordance with FIG. 5 for a 105.1° F. maximum outdoor temperature day and a 90° F. maximum temperature day, respectively.

FIG. 5A depicts a theoretical plot of cycle average power versus time of day. The "cycle average power" is defined as the average power consumed by the system during one complete ON and OFF cycle. The cycle average power is typically much less than an instantaneous power demand as upon startup of the air conditioning compressor. While the utilities net air conditioning power demand is made up of the sum of the instantaneous power demands from all the air conditioning units in a given service area, the cycle average power for a typical building is believed to be representative of the ensamble average power consumed by a large number of buildings. If the load shedding device does not disturb the natural diversity, the cycle average power, then, is a good measure of the average power demand per building in a given service area. If the natural diversity is destroyed, as in some of the examples herein, however, all the cooling plants will be operating at one time which results in a great deal more power than the cycle average power being drawn which could be disastrous.

In each of the example plots as in 5A and 5B wherein the cycle average power versus time of day are depicted, each horizontal step in the plot represents the level of average power consumed over one complete ON and OFF cycle. Each method of load saving is compared to the case of a fixed 76° setpoint which represents a typical undisturbed system. The dashed curve in FIG. 5A represents the cycle average power required if the ramping strategy of FIG. 5 is followed on the same day. The upward ramping interval can be timed to coincide with the peak power demand of the utility which is typically between 12:30 and 6:30 p.m. on such a day. After the peak demand interval is passed, the downward ramping cools the space gradually back down to the original control point. The additional power required to cool the building and contents back down to the original control point is consumed after the peak demand interval which, in effect, shifts the load from the peak demand period to the evening hours when the total network power demand is typically low. The area between the curves, of course, represents the cycle average power reduction of the system during the peak hours.

Figure 5B:
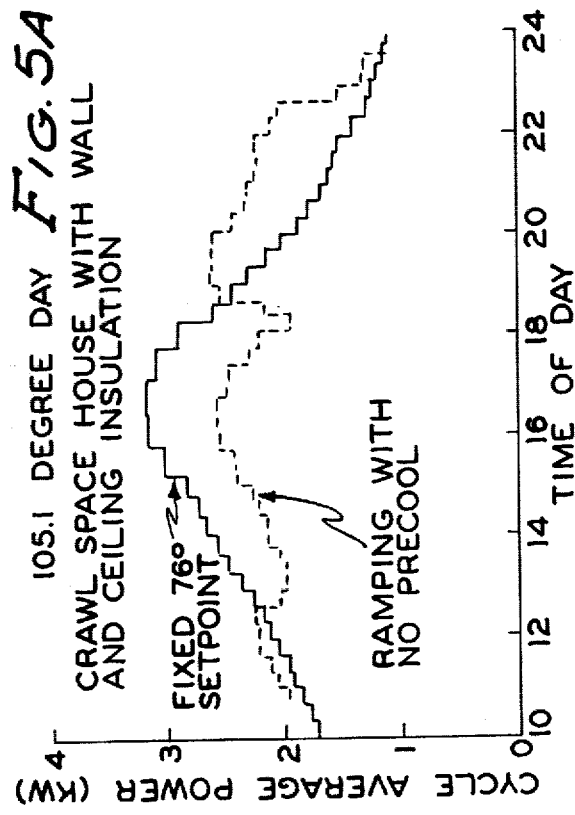

FIG. 5B depicts the cycle average power versus time of day plot for the load shedding method of FIG. 5 for a 90° day. While the total load is much less inasmuch as the temperature difference is less extreme, it may be noted that the average load shed during the peak demand interval is very nearly the same on both days. Thus, the power company can expect approximately the same degree of load shedding during the peak demand interval on either day and the ramping strategy of FIG. 5 is utilized.

FIG. 6 depicts a comfort temperature versus time of day plot similar to that of FIG. 5 with one important difference. In FIG. 6, the setpoint was ramped down three degrees between the hours of 10:30 and 12:30 at 1.5° F. per hour. This precooling allows the subsequent upward ramping to take full advantage of the 9° F. upward ramp between the hours of 12:30 and 6:30 p.m. at 1.5° per hour. The downward ramping after 6:30 p.m. is the same as that for FIG. 5. This results in a somewhat lower average temperature for the conditioned space during the time interval without sacrificing any load shedding during the peak demand interval. The regular sawtooth temperature waveform shows no sign of disturbance due to the changing ramp rate and, thus, no loss of natural diversity due to the strategy is indicated. Again, the maximum temperature of 82° for the conditioned space has been selected.

FIG. 6A is the corresponding cycle average power versus time of day plot for the load-shedding strategy in accordance with FIG. 6. A comparison of this with FIGS. 5A and 5B indicates somewhat greater load shedding during the demand interval but a slightly greater total power consumption inasmuch as the 3° of precool require somewhat more energy.

FIG. 7 is a plot of comfort temperature versus time of day for a conventional thermostat having a fixed setpoint. The sawtooth waveform of indoor comfort temperature is above the setpoint showing the effects of the proportional offset or "droop" inherent in conventional thermostats which have no integral reset function. The temperature waveform depicted in FIG. 7A is held nearly constant on the setpoint line by the addition of integral reset action in the subject device. The offset between the temperature waveform and the setpoint line in FIG. 7 increases with the magnitude of the cooling load and at midday reaches its maximum which may be as much as 3° F. While the slightly higher indoor air temperature maintained by the thermostat without integral reset action results in the consumption of less total energy, it also results in less load shedding during the peak demand interval because there is far less room for ramping to the preselected maximum temperature, e.g. 82° F. Also, it is conventional for one to manually lower the fixed setpoint in a "drooping" thermostat to achieve the same degree of comfort as with the integral reset model.

FIG. 7B is a plot of comfort temperature versus time of day in which the thermostat is incrementally raised in finite steps at the start of each hour during the load shedding interval. After the load shedding interval, the setpoint is incrementally stepped downward to return to the original setpoint. As can be seen from the deviation of the sawtooth waveform, the thermostat used is one without integral reset. The rather large initial step at 12:30 p.m. assumes that the sensor reading is approximately 2 degrees high at that point and this correction is taken in addition to the normal step of one-sixth the difference between the sensor temperature and 82° F. This large step turns the air conditioning compressor off for over one-half hour as does each ensuing step of approximately three-quarters of 1° F. Each such incremental step, however, has the effect of synchronizing the operation of each air conditioner thereby destroying the desired natural diversity in the network. This will cause a serious demand spike following each incremental setup. Also, all the desired setups cannot be utilized inasmuch as the control temperature drifts above the limited 82° F. prior to the last two setup steps. Again, at 6:30 p.m., the setpoint is incremented downward at 1.5° F. per hour in the downward increment is repeated each hour until the original setpoint is reached.

FIG. 7C is again a comfort temperature versus time of day plot utilizing the ramping technique of the present invention but with a thermostat which does not have integral reset. The purpose of this plot is to show that while successful load shedding does occur utilizing the ramping technique without integral reset, ramping and integral reset work together synergistically. In FIG. 7C, at 12:30 p.m. the setpoint is incremented to the sensor reading as before to defeat setpoint adjustment just before the load shedding interval. The ramp rate is determined by the difference between the 82° F. upper limit and the sensor reading at 12:30 p.m. The upward ramping rate is only approximately 0.7° F. per hour because of the original control offset due to the drooping of the thermostat which was present at 12:30 p.m. This greatly reduces the allowed ramping rate and thereby reduces the positive effects of the load shedding during the load shedding interval. The same strategy with integral reset, of course, is shown in FIG. 5.

The initial reset point at 12:30 which synchronizes the comfort temperature with the setpoint temperature also has the effect of synchronizing the air conditioning systems because of this large initial step change. Again, the proportional offset which has not been cancelled by integral reset device in this example causes the sensor reading to reach the upward limit of 82° well before the setpoint has ramped its entire allowable distance. Thus, ramping stops at approximately 4:00 p.m. and the setpoint is held constant until the end of the demand interval. At 6:30 the setpoint is again ramped back to the original level.

FIGS. 7D and E show the cycle average power versus time of day curves for ramping a thermostat with integral reset versus (1) the setpoint being stepped up in discrete steps (FIG. 7D) and (2) ramping with a conventional drooping thermostat when the setpoint is reset at 12:30 p.m. (FIG. 7C). Both are compared with the conventional fixed 76° setpoint curve.

It should be noted that in the case of both thermostat systems which do not have integral reset, a great deal of initial load shedding relief attributed to dynamic load shed occurs at the first reset point. And in the case of FIG. 7D, discrete spikes of load shedding occur at each stepping point. However, the overall amount of load shed by the ramping thermostat having integral reset is superior either to the discrete stepping up of the thermostat without integral reset or the ramping of a conventional thermostat without integral reset. This is especially true in the later hours, i.e after 4:00 p.m. when the higher control points of the thermostats without integral reset causes the setpoint increase to be curtailed as the comfort temperature reaches 82° F. Thus, the ramping with the integral reset appears superior both from the standpoint of the amount of load shed during the load shedding interval and the average comfort temperature of the conditioned space.

An important conventional method of load shedding which has been utilized and contemplated by electric power utilities involve the concept of duty cycling. FIG. 8 is a plot of comfort temperature versus time of day for the duty cycling concept utilizing three different timed duty cycles. These include 10, 15, and 20-minute cycles per half hour which denote the amount of time for each one-half hour that the power is shut off to the air conditioning compressor or the interval that the compressor is locked out by the duty cycle.

The conventional thermostat detects the increase in space temperature and calls for cooling. When the thermostat calls for cooling, in most residential applications, both the indoor blower and the compressor are turned ON. The duty cycle device is commonly installed in such a way that only compressor operation is prevented during the OFF time of the duty cycle. Thus, the indoor blower runs continuously during the duty cycle period.

Clearly, both the 20-minute and 15-minute duty cycle strategies allow the indoor comfort temperature to rise above the 82° limit. If the air conditioning compressor in this example had been undersized, the upward excursion and air temperature would have been even greater.

This illustrates the fundamental problem with duty cycling which is the lack of comfort temperature control of any kind during the load shedding interval. FIG. 8C is a plot similar to 8A for a 90° day.

FIG. 8A depicts the cycle averge power versus time of day for the 10, 15, and 20-minute duty cycling concepts of FIG. 8. As expected by the great degree of temperature overrun in the 15 and 20-minute duty cycling, a great deal of load is actually shed during the peak demand interval and it increases dramatically as the length of the duty cycle is increased. However, the strategy definitely will synchronize the operation of all the air conditioners controlled on a specific duty cycle. To counter this problem, the utilities must start the duty cycling strategy for sub-groupings of the installed duty cyclers. Each sub-group is started out of phase with each other group in an attempt to maintain the natural diversity of the control loads. This, of course, requires additional communication channels or additional communication time on a single channel to coordinate all these efforts. Also, as can be seen in FIGS. 8A and 8C, a tremendous amount of energy over a long term is required for recovery at the end of the duty cycling.

The 10 and 15-minute duty cycle strategies as depicted for a 90° day in FIG. 8B do not cause a significant temperature rise in the conditioned space because the cooling loads are much lower and the air conditioning compressor can almost satisfy the cooling load during the allotted period of the duty cycle. Only the 20-minute strategy causes a significant rise in indoor comfort temperature. In both the example of FIG. 8 and FIG. 8B, it has been assumed that the air conditioning system was properly sized for the peak load on the 105' day.

Of course, were the air conditioning system oversized, the temperature increase would be lower in all cases because of the better ability to recover. The load shed, however, would be greatly reduced or eliminated depending on the degree of oversizing because the oversized system would draw a great deal more power when operating.

On the other hand, if the air conditioning system were undersized, the comfort temperature increase would have been more dramatic in all cases. This is due, of course, to the fact that the duty cycling device does not sense or control air temperature. It is an open loop device and as such is completely insensitive to the particular needs of the conditioned space.

Of course, one of the essential conditions of the load shedding scheme of the present invention which makes it more acceptable is that it does not cause undue discomfort for any of the occupants of the conditioned space. If a duty cycling strategy could be tailored to each installation, it would perform satisfactorily in both comfort temperature and power control. It would not be practical, however, for utilities to tailor the strategy of each of the thousands of installations necessary in order for significant load shedding to be accomplished in a power network.

FIG. 8C is a plot of cycle average power versus time of day for the three load shedding strategies of FIG. 8B, i.e. on a 90° day. As can be seen in a comparison of FIGS. 8A and 8C, the duty cycling strategies yield far less load shed on a 90° than on a 105° day. In fact, the 10-minute and 15-minute duty cycling strategy actually increases the demand for power above that for the fixed 76° setpoint comparison plot. Under these conditions, of course, duty cycling is totally unacceptable.

An additional drawback to duty cycling which is not found in the system of the present invention involves the fact that duty cycling devices are typically installed on the outdoor unit of a split system air conditioner and thereby control or cycle the compressor only and not the indoor circulating fan. The existing thermostat retains control of the indoor distribution blower. When the duty cycling strategy causes the indoor air temperature to rise, the thermostat causes for cooling and it turns on the indoor distribution blower. This causes the distribution blower to operate even when the compressor is off which is not the case for thermostatic control alone and therefore there is somewhat of a demand increase over the uncontrol fixed at 76° setpoint situation. In fact, in cases where the ducts are located in higher temperature portions of the house such as attic crawl spaces, the indoor space temperature may actually be increased due to heat which leaks into the distribution ducts and is blown into the conditioned space by the blower.

Figure 9A:
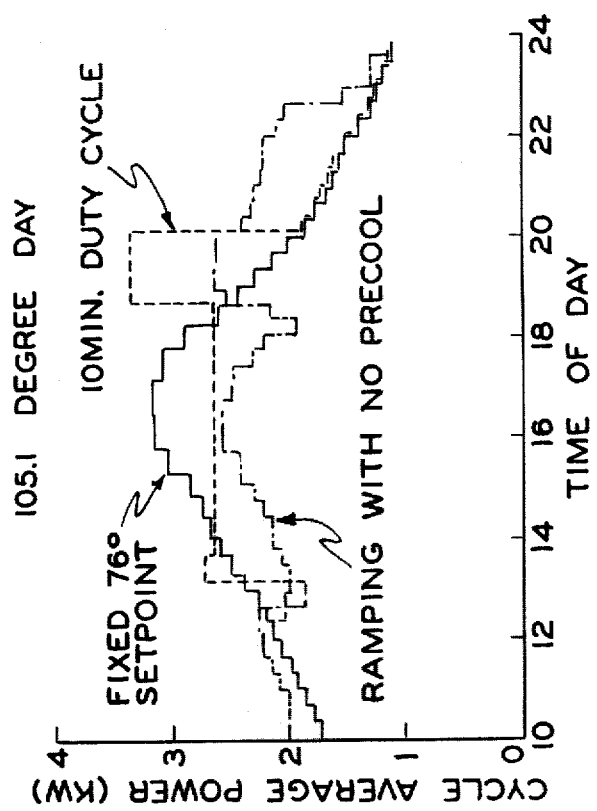
FIGS. 9 and 9A depict cycle average power consumption versus time of day comparing a ten-minute duty cycle concept with a fixed 76° setpoint and a ramping cycle without precooling showing the relative amounts of load shed at two different maximum outdoor temperature days.
Figure 9:
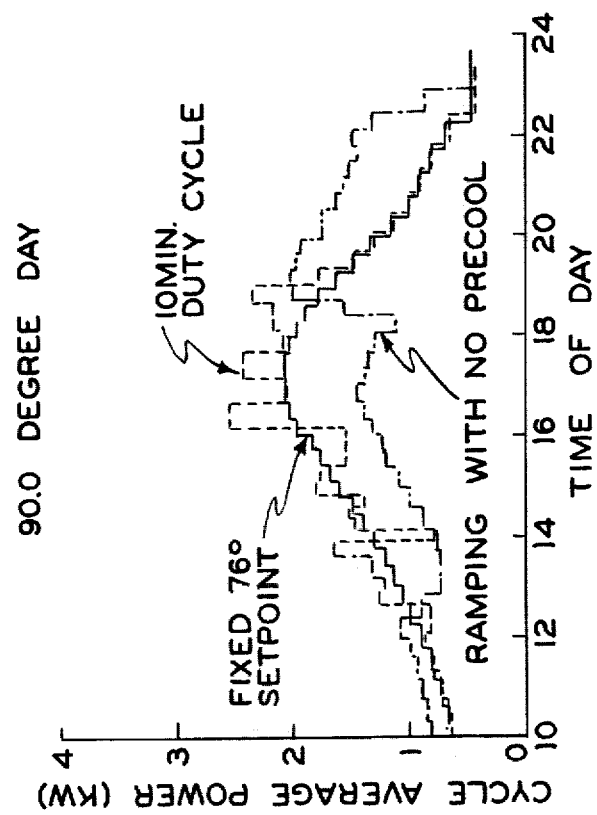

FIGS. 9 and 9A again depict cycle average power versus time of day for two different temperatures comparing the 10-minute duty cycling system (which is generally the most acceptable to the occupants of the conditioned space) with the unregulated fixed 76° setpoint plot and the straight ramping without precooling in accordance with the present invention. It should be noted that the ramping system produces more load shedding in the load shedding interval than the 10-minute duty cycling system at both the 105.1° and the 90° days. This is done with less discomfort to the occupants of the conditioned space.

TABLE 1

| Load Shedding Strategy | Peak Outdoor Air Temp. (°F.) | Average Load Shed (%) | Peak Load Shed (%) | Energy Savings (%) | Peak Indoor Comfort Temp. (°F.) |
|---|---|---|---|---|---|
| Set-point Ramping with Integral Reset Action and 3° F. of Precooling | 90.0 | 40.73 | 41.03 | −6.48 | 82.1 |
| | 95.0 | 32.58 | 34.56 | −4.89 | 82.1 |
| | 100.9 | 24.02 | 25.95 | −3.92 | 82.1 |
| | 105.1 | 22.70 | 24.02 | −4.60 | 82.1 |
| Set Point Ramping with Integral Reset Action and No Precool | 90.0 | 34.18 | 30.90 | −2.72 | 82.1 |
| | 95.0 | 27.75 | 26.07 | −1.59 | 82.1 |
| | 100.9 | 20.02 | 18.96 | −1.74 | 82.1 |
| | 105.1 | 19.76 | 18.88 | −1.99 | 82.1 |
| Set Point Ramping with No Integral Reset Action and No Precool | 90.0 | 36.38 | 18.77 | 11.99 | 82.5 |
| | 95.0 | 28.38 | 15.44 | 9.81 | 82.5 |
| | 100.9 | 19.50 | 9.84 | 6.36 | 82.6 |
| | 105.1 | 19.86 | 10.13 | 5.23 | 82.7 |
| Thermostat Set Point Stepped Up from 76° F. to 82° F. over the Peak Demand Interval | 90.0 | 47.92 | 24.34 | 14.47 | 83.7 |
| | 95.0 | 40.10 | 13.51 | 11.61 | 83.9 |
| | 100.9 | 30.31 | 13.49 | 8.50 | 84.3 |
| | 105.1 | 29.55 | 14.08 | 7.48 | 84.3 |
| Set Point Incremented Up in Discrete Steps Each Hour Over the Loading Shedding Interval | 90.0 | 37.55 | 22.67 | 12.89 | 83.0 |
| | 95.0 | 26.87 | 15.04 | 8.99 | 82.5 |
| | 100.9 | 21.24 | 10.39 | 6.81 | 82.9 |
| | 105.1 | 21.07 | 10.52 | 5.80 | 83.0 |
| 10 Min. Per Half Hour Duty Cycle | 90.0 | −6.66 | −22.39 | −7.04 | 78.7 |
| | 95.0 | −5.69 | −6.46 | −1.81 | 78.8 |
| | 100.9 | 7.07 | 14.58 | 0.29 | 82.0 |
| | 105.1 | 10.86 | 15.64 | −0.08 | 82.6 |
| 15 Min. Per Half Hour Duty Cycle | 90.0 | −6.13 | 0.74 | −9.82 | 79.6 |
| | 95.0 | 5.37 | 15.75 | −2.27 | 81.7 |
| | 100.9 | 26.20 | 31.41 | 3.33 | 86.6 |
| | 105.1 | 27.63 | 33.19 | 3.71 | 87.0 |
| 20 Min. Per Half Hour Duty Cycle | 90.0 | 15.23 | 24.92 | −6.52 | 83.5 |
| | 95.0 | 28.67 | 37.19 | 2.34 | 86.1 |
| | 100.9 | 45.45 | 48.81 | 8.20 | 90.9 |
| | 105.1 | 46.32 | 50.24 | 8.31 | 91.4 |

Table 1 summarizes the performance of each of the load shedding strategies. The performance of each load shedding technique is given for operation on four different days having different cooling loads. The peak outdoor air temperature for each of the four days is given in column one. Column two shows the average load shedding expressed as a percentage of the average power demand which would result without the use of a load shedding device. The average load shed is averaged over the entire peak demand interval. The third column represents the peak load shed expressed as a percentage of the peak load which would occur without the use of a load shedding strategy. The fourth column gives the electrical energy saving due to the use of the load shedding strategy as a percentage of the 24-hour electrical energy consumption. The fifth column is the peak indoor comfort temperature which occurred during the load shedding interval.

Wherever a load shed percentage is negative the loads were not reduced but were, in fact, increased by the percentage indicated. Similarly, a negative energy savings is an energy loss due to the application of the load shedding strategy under the conditions indicated.

A load shedding device affects both power consumption and indoor comfort temperature. If two load shedding strategies yield the same load shed with the same increase in indoor comfort temperature, they are said to be equal in performance. The 10-minute duty cycle strategy causes the indoor comfort temperature to reach 82° on both the 100° and 105° day. The setpoint ramping strategies with integral reset action raise the indoor comfort temperature to 82° under all conditions, thus, the load shedding percentage of the 10-minute duty cycle strategy on the 100° F. and 105° F. days can be compared directly with the load shedding percentages for the ramping strategy.

It is noteworthy that the average load shed percentage is nearly twice as good for the present invention relative to the 10-minute per ½ hour duty cycle. The peak load shed percentage is 20 to 40 percent greater for the present invention.

While the 15 and 20 minute per ½ hour duty cycle strategies clearly shed more load than does the ramping device, during the load shedding interval, the indoor comfort temperature, however, rises to unacceptable levels with these strategies. Clearly, for a given reasonable upper limit on indoor comfort temperature, the ramping strategies of the present invention yield superior load shedding performance.

The energy saving column is the estimated energy saved by use of the load shedding strategy relative to the energy consumption for a building with a conventional thermostat having a fixed setpoint of 76° and no integral reset action. For the ramping strategy, the setpoint was assumed to be 76° also when not in the ramping mode. It should be noted that the indoor air temperature with integral reset action is lower at a given setpoint than is the case without integral reset action (FIGS. 7 and 7A). The lower indoor air temperature (closer to the setpoint) requires additional cooling energy over the entire day which offsets the energy saving which occurs during the load shedding interval.

This result is not entirely valid, however, for all conditions of operation. If the occupants set the conventional thermostat to the same value as one with integral reset action, then more energy will be consumed. If the occupants adjust the setpoint lever of the conventional thermostat to yield the same comfort conditions, however, the energy consumption outside the load shed interval will be nearly the same. During the load shedding interval, the ramping device saves energy, and hence a net energy saving would result. This comparison is made because in the actual application of the present invention, a conventional thermostat without integral reset action would be removed from the site and the subject invention with integral reset action would replace it.

The average load shed percentage for the ramping device with integral reset and the ramping device without integral reset is nearly the same. The peak load shed percentage, however, is approximately one-half as great for the device without integral reset action. This is due to the maldistribution of load shedding which results without the accurate temperature control afforded by the integral reset action. Thus, the two features—ramping and reset action—work synergistically to produce the desired performance.

While the step-change thermostat yields good average performance, the peak load shed is not quite as great. Furthermore, the indoor comfort temperature exceeds the 82° limit making direct comparison between that device and the present invention less valuable. If the step-change were limited to a setting less than 82° so that the comfort temperature would not exceed the 82° limit, the load shedding performance would be reduced relative to a ramping device.

Similarly, the device with incremental setpoint changes in discrete steps on the hour yields good average performance and poor peak load shed performance. That, coupled with the tendency to synchronize the operation of the air conditioning plants in the utility service area, makes that device less desirable. The subject device is clearly an improvement over all these examples of attempts at optional load shedding.

The embodiments of the invention in which an exclusive property or right is claimed are defined as follows:

1. A method of controlling electrical power demand of a space-conditioning load comprising the steps of:
assuming control of the setpoint function of the space-conditioning thermostat associated with said load;
causing a simulated value representing the setpoint of said space-conditioning thermostat associated with said load to change substantially continuously with time at a first rate to a first predetermined space temperature limit wherein said first rate is a function of the difference between said simulated set point at the time control is assumed and such first predetermined temperature limits and the predetermined electrical power demand control interval; and
returning control of said setpoint function to said thermostat.

2. The method of claim 1 further comprising the step of causing said value representing said setpoint of said thermostat to change substantially continuously with time in the opposite direction from said first change at a second rate after said first predetermined time interval to a second predetermined temperature limit prior to returning control of said setpoint function to said thermostat.

3. The method of claim 1 further comprising the step of causing the sequence of steps to be responsive to at least one externally controlled command signal.

4. The method of claim 3 wherein said signalling is under the control of the electrical power supplier.

5. The method of claim 4 further comprising the step of signalling a plurality of systems substantially simultaneously.

6. The method of claim 1 further comprising the step of causing said value representing said setpoint to change substantially continuously with time at a predetermined rate in a direction away from the direction to said first predetermined temperature limit prior to causing said value representing said setpoint to change toward said first predetermined temperature limit.

7. The method of claim 1 wherein said step of changing said value representing said setpoint toward said first predetermined temperature further comprises:
sensing the conditioned space temperature at the time said control is assumed;
comparing said conditioned space temperature with said first predetermined space temperature limit;
equating said value representing said setpoint with said conditioned space temperature;
comparing said space temperature with said first predetermined temperature limit; and
changing said value representing said setpoint from said sensed space temperature to said first predetermined space temperature limit at a constant rate equal to the difference between the simulated value representing the setpoint at the time control is assumed and the first predetermined space temperature limit divided by said predetermined power demand control interval.

8. The method of claim 7 wherein said predetermined temperature to which said value representing said setpoint is initially equated is said conditioned space temperature.

9. The method of any of claims 1, 7 or 8 wherein said first predetermined temperature limit in a heating mode is 62 F.

10. The method of any of claims 1, 7 or 8 wherein said first predetermined temperature limit in a heating mode is 62 F.

11. The method of any of claims 1, 7 or 8 wherein said rate of change of said value representing said setpoint does not exceed a predetermined limit.

12. The method of claim 11 wherein said predetermined limit of said rate of change is 1.5° F. per hour in a cooling mode.

13. The method of claim 11 wherein said predetermined limit of said rate of change is 2.0° F. per hour in a heating mode.

14. The method of claim 1 wherein said simulated first rate is a substantially constant rate equal to the difference between the simulated value representing said setpoint at the time control is assumed and said first predetermined space temperature limit divided by said predetermined power demand control interval.

15. An apparatus for controlling the operation of a thermostatically controlled space-conditioning load comprising:
means for establishing control over the function of the setpoint of the thermostat controlling the operation of said electric space-conditioning load;
means causing a simulated value representing said setpoint to change substantially continually with time at a first rate in a first direction until a first predetermined temperature limit is achieved wherein said first rate is a function of the difference between the value of said simulated setpoint at the time control is assumed and said first predetermined temperature limit and the predetermined electrical power demand control interval; and
means for relinquishing control over said setpoint function after said setpoint reaches said second predetermined temperature limit.

16. The apparatus of claim 15 further comprising means causing said value representing said setpoint to change substantially continuously with time at a second rate until a second predetermined temperature limit has been reached.

17. The apparatus of claim 15 further comprising signal receiving means responsive to at least one externally controlled command signal.

18. The apparatus of claim 17 wherein said signal receiving means is a radio receiver.

19. The apparatus of claim 17 wherein said external signals are under the control of the electrical power supplier.

20. The apparatus of claim 15 wherein said means causing said value representing said thermostat control setpoint to change further comprises:
means for generating a signal indicative of the temperature in said conditioned space;
means for comparing said signal of said sensed temperature in said conditioned space with said first predetermined limit temperature;
means for determining said first rate such that said value representing said thermostat setpoint changes substantially continuously at a substantially constant rate with time such that said value representing said thermostat setpoint would reach said first predetermined temperature limit at the end of said predetermined time interval; and
means for changing said value representing said setpoint at said rate.

* * * * *